(12) United States Patent
Froloff et al.

(10) Patent No.: US 6,947,830 B1
(45) Date of Patent: Sep. 20, 2005

(54) ADAPTIVE VARIABLE FUEL INTERNAL COMBUSTION ENGINE

(76) Inventors: Walt Froloff, 273 Searidge Rd., Aptos, CA (US) 95003; Kenneth C. Miller, 402 W. Seaclif Dr., Aptos, CA (US) 95003

( * ) Notice: Subject to any disclaimer, the term of this patent is extended or adjusted under 35 U.S.C. 154(b) by 2 days.

(21) Appl. No.: 10/930,926

(22) Filed: Aug. 31, 2004

(51) Int. Cl.[7] ............................................. G06F 19/00
(52) U.S. Cl. ...................... 701/111; 701/114
(58) Field of Search ...................... 701/111, 110, 114, 701/104, 107

(56) References Cited

U.S. PATENT DOCUMENTS 5,357,928 A * 10/1994 Ohtsuka ................ 123/406.47
6,684,151 B1 * 1/2004 Ring ........................... 701/110
6,745,744 B2 * 6/2004 Suckewer et al. .......... 123/297

* cited by examiner

Primary Examiner—Hieu T. Vo
(74) Attorney, Agent, or Firm—Walt Froloff

(57) ABSTRACT

A programmable internal combustion engine, comprising programmable computer processor controlled engine components including electronically controllable valves, fuel injection and air fuel mixture ignition cylinder components, is programmed to dynamically reconfigure an internal combustion engine to run on a range of combustible fuels. Cylinder independent ignition test modes using Spark Ignition, Homogeneous Charge Compression Ignition and Compression Ignition are performed to determine the best ignition mode and cylinder component states for combusting a given fuel. In situ real-time testing of a given fuel yield results for a dynamic reconfiguration of individual component states providing an engine which can run on a range of combustible fuels and fuel blends.

21 Claims, 17 Drawing Sheets

Detonation Signals at Variable Ignition Times

FIG.6 SI Duty Cycle Timing Diagram

FIG.10  HCCI Cycle Timing Diagram

FIG.13    CI Duty Cycle Timing Diagram

ADAPTIVE VARIABLE FUEL INTERNAL COMBUSTION ENGINE

BACKGROUND OF THE INVENTION

1. Field of the Invention

The field of the present invention relates in general to the fields of internal combustion engines and operation with variable types of fuels. More particularly, the field of the invention relates to adaptively controlling an internal combustion engine to operate on various fuels. The engine coupled with an adaptive control system performs in situ tests on the given fuel and based on these tests, configures the engine components to operate in a power cycle to take optimal advantage of the given fuel.

2. Background

Internal combustion engines are currently designed to run on a specific or particular type of fuel. This is a historical result based on manufacturing and assembly lines for economies of scale, aimed to keep vehicle price tag in the affordable range. Thus, engine designs were based on available fuels, which could be produced in mass quantities and lowest prices. This in turn resulted in internal combustion engines which burned a single type of fuel and only that particular fuel because the fuel combustion characteristics dictated that one and only that one combustion ignition method and engine component parameters static and dynamic, be used for maximum fuel efficiency at tolerable engine wear.

Current fuel sources and future fuel resources present the potential of many different combustible fuels, which cannot effectively be exploited by these single fuel design engines. Advanced computer technology is the difference that adds capability to engine designs. Engine designs that were not available when the basic internal combustion engine designs were cast. The rigid mechanical controls in early basic Otto and diesel engine from such components as camshafts and piston rod lengths have persisted and constrained engines to single fuels. While this is not an issue where the required fuel is cheap and abundant, consumers today are under large fuel price escalation and fluctuation pressures without recourse, as their engines depend on the one type of fuel set at engine manufacturing time. Even fuels that differ only slightly, high and low octane differ only by a few percent, bifurcate design into engines that can only burn high octane and engines that can only burn low octane. Running alternate fuels on current engine will greatly reduce engine life giving little or no engine performance.

Fuel prices generally go up uniformly despite a free economy and competition. Vehicles will need to be more adaptable to the kind of fuels they can use because structured, well defined distribution channels of various fuels will compete more efficiently and optimally where there is more consumer choice of fuels. Today's obsession with higher energy density or high performance fuels will have tradeoffs with available fuels and even low performance fuels. The future economics of fuels will have scarcities and distribution fluctuations. Consumers may need to look for fuel production locally available or even "grown" from what ever is proximately available as fuel candidates. Alternate fuel distribution stations and centers will need to enter the market. Hence there is a need for an internal combustion engine that is capable of ascertaining the type of fuel put in its tank in real-time and re-programming the engine operation parameters to accommodate that fuel or fuel blend accordingly.

Some automotive leaders are calling for a change to hydrogen fueled vehicles. California is contemplating a "hydrogen highway," complete with 200 hydrogen filling stations, one every 20 miles. The public sector is pledging to pick most of the $100 million cost in California, the world's large car market. Vehicles will be transitioning to hydrogen fuel for the "hydrogen economy." However, vehicle fuels used will vary for many political and economic reasons, with the vehicle engine being the perhaps only consumer controllable quantity. Hence there is a need for multi-fuel engines. This need is an engine that can run on available fuel and hydrogen if it is proximately available.

Hydrogen Powered Vehicles

Some auto industry experts proclaim hydrogen will be the next fuel used to power vehicles and some car manufactures have built model hydrogen fueled cars. These have come in two very different technologies. One way is a hydrogen fuel cell electric vehicle. The other method is to use hydrogen to fuel an internal combustion engine. Here the hydrogen is combusted with oxygen to generate power, hence turbo and super charging increases engine power and idle engine strokes wastes fuel. Innovations to the internal combustion engine will be directly applicable to hydrogen fueled internal combustion engines of the future. A new Ford model hydrogen fueled internal combustion engine is optimized to burn hydrogen through the use of high-compression pistons, fuel injectors designed specifically for hydrogen gas, a coil-on-plug ignition system, an electronic throttle, and new engine management software. This engine requires supercharging, which provides nearly 15 psi of boost on demand, but the engine is claimed to be up to 25 percent more fuel-efficient than a typical gasoline engine. Designing a spark ignition engine to burn hydrogen fuel has typically resulted in significantly lower power output, without supercharging. Even with supercharging, the hydrogen powered SI engine only delivers about the same power as its gasoline counterpart. This has been done at the expense of excluding gasoline combustion in the same engine, running hydrogen fuel exclusively. What are needed are engines that can exploit hydrogen fuel to greater potentials in power, efficiency and reduced pollution without foreclosing on the option of running on gasoline.

Hydrogen has a very wide combustion range, varying from 4 to 75 percent, hydrogen-fueled engines are able to use a wider range of air-fuel mixtures than gasoline engines, and can be run in the fuel-efficient "lean" regime without the complications of pre-ignition or "knock." However, they have their own set of combustion challenges. What are needed are engines that can use hydrogen to attain their full potential, perhaps by combusting in an alternate mode like HCCI or blending with other fuels for alternate combustion characteristics.

Hydrogen Fuel Economy

Hydrogen fuels offer many advantages over current gas/diesel. However, a hydrogen engine will require hydrogen fuel. The currently guess is that it will be a 10 year transition to a hydrogen economy. Thus, hydrogen powered engines will only be sold where there is hydrogen fuel available. Hydrogen fuel stations are not likely to be economic unless there are sufficient hydrogen vehicles needing fuel. This chicken-egg paradigm inhibits the transition to a hydrogen economy. What is needed are engines which can run on currently available gas/diesel fuels as well as on hydrogen fuel, so as hydrogen fuel stations come to the market, they will have demand sufficient to make them a feasible alternative. What are needed are engines that can run on hydrogen and currently available or transitional fuels, to facilitate the market economics of hydrogen as well ad providing vehicle engines for transportation.

Hydrogen Economy Transition

As the worlds fuel consumption continues to accelerate, the supply of alternate sources and types of fuels will need to be exploited to meet demand. A hydrogen economy is in the foreseeable future but the transition from hydrocarbon to hydrogen fuels will be less painful if vehicle engines can run variable fuels. What is needed is an internal combustion engine that can use whatever fuel composition is available, be it octane, cetane, hydrogen, etc. What is needed are engines which will adapt and reconfigure themselves to whatever fuels are being put in their fuel tank.

Seeding Chemistry Approach to Alternate Fuels

Diesel engines and Homogeneous Charge Compression Ignition (HCCI) engines rely on auto-ignition for the initiation of combustion while in spark ignition (SI) engines auto-ignition leads to knock, which is a major constraint on efficiency and power. Where fuel and air are premixed as in the HCCI or SI engine some things are known. Practical fuels used in such engines are complex mixtures of hydrocarbons whose auto-ignition chemistry is not understood in detail. The auto-ignition quality of such a fuel has to be defined using an empirical approach. It can be best described by an Octane Index, OI defined as OI=(1−K)RON+K MON where RON and MON are the Research and Motor octane numbers respectively of the fuel while K depends only on engine design and operating conditions. The larger the OI, the greater is the resistance to auto-ignition. The RON and MON of any fuel can be determined by standard procedures that are based on comparing the fuel to mixtures of the two paraffinic fuels iso-octane and n-heptane for knocking behavior in a single cylinder test engine. The value of K is found empirically by ranking fuels of different chemistry for their auto-ignition behavior at a given operating condition. K can vary widely and can be negative or greater than unity depending on the pressure/temperature history of the air-fuel mixture. However K does not vary randomly but depends strongly on generic engine parameters such as the compression temperature at a fixed pressure in the engine and can be estimated from empirical results if such parameters can be predicted.

Calculations on a Homogeneous Charge Compression Ignition (HCCI) engine have been performed using zero-dimensional models. The simplest model compressed the gas to auto-ignition, using temperature and pressure at a certain crank angle position obtained from engine experiments.

It was found that calculations with good agreement could be accomplished, if using correct temperature, pressure and air-fuel mixture composition. However, the calculations proved to be extremely sensitive to even small variations in temperature. Further, natural gas engine calculations showed a high sensitivity to the contents of higher hydrocarbons such as ethane, propane and butanes. The validity of the kinetic mechanism was also a crucial factor. Due to the assumption of total homogeneity in the combustion chamber, a too rapid heat release was predicted.

A reaction mechanism for formaldehyde, methane and methanol was developed. The aim was to produce a combustion ignition mechanism of general characteristics, covering formaldehyde, methane, and possible methanol, giving correct species profiles for intermediate products. The mechanism was capable of accurately predicting ignition delays for formaldehyde and methane over a wide range, gave decent methanol auto-ignition prediction, and could further accurately predict the species profiles for formaldehyde but was not capable of calculating flame speeds for methane.

A semi-detailed reaction mechanism for Primary Reference Fuels, mixtures of iso-octane and n-heptane, has been developed. The predictions of ignition delay times shows a good agreement to experiments. Much has been done to study various fuels in internal combustion engines and many numerical models are available. What are needed are smart internal combustion engines that can use those models and empirical data, and engines can determine fuel combustion characteristics, engines that store their own design parameters and can re-configure themselves for a given particular fuel.

Fuel Gas and its Use in Natural Gas Engines

The main constituent of natural gas is methane; the Alaskan contains nearly ninety nine percent, and the Indonesian less than ninety. The remainders are ethane, propane, butane and propylene. The amount and combination of each component species in natural-gas oriented gaseous fuels, especially the ratio between propane and butane, change day by day. The constituent change of natural-gas oriented fuels results in the fluctuation of ignition characteristics for the internal combustion engines. The increase of butane content compared to propane would bring the spark-ignited natural gas engines to easier knocking tendency. Ignition characteristics of fuels are much more important for the HCCI engines, in which the ignition timing depends directly on the fuel ignition characteristics. Ignition timing itself dominates power output and fuel economy of the HCCI engines. The fuel species fluctuation in the supply lines adds another challenge to marketable HCCI engines. What are needed are HCCI engines that can adapt to alternate fuel species.

Basic ignition delay data are available, which recognize the anti-knock properties of supplied mixed fuels. Furthermore, some measures have been found to eliminate the fluctuation of ignition characteristics of fuels include an ignition-control concept utilizing the gaseous formaldehyde as an additive to realize premixed compression-ignition engines and to maintain stabilized operation of spark-ignited natural gas engines.

The formaldehyde is the most important intermediate during the pre-flame period up to the hot-flame establishment; closely related to the cool-flame appearance. It can be easily expected that formaldehyde is effective in promoting ignition of the non-cool-flame generating fuel such as methane; the other way around about the cool-flame generating fuels.

A present challenge in the premixed fuel HCCI engine is the lack of effective ignition control procedure. Some have proposed and confirmed that the formaldehyde as an efficacious additive into the mixture to realize wide-range premixed compression-ignition operation of the natural gas engine.

Measures to eliminate the fluctuation of ignition include lean air-fuel mixtures with various fuel/fuel ratios between methane and n-butane, supplied to a premixed HCCI engine with or without supplementary gaseous formaldehyde induction as an ignition control additive. The amount of formaldehyde at hundreds parts per million of total mixtures. In the no additive case the methane and butane function as the two fuels in the high/low-octane two-fuel premixed HCCI operation we proposed previously as another ignition control procedure. The formaldehyde addition to the methane-butane-air mixtures has given the engine desired and stable ignition timings controllable by the amount of formaldehyde to be added, almost independent on the fuel/fuel ratios between methane and butane. The efficacy of formaldehyde has been confirmed as an ignition control medium for the compression ignition of hydrocarbon-air mixtures.

The experimental evidence suggests that other fuels besides the traditional gas and diesel offer potential substitutes. What are needed are internal combustion engines that can take advantage of these blends, natural gas fuels, hydrogen and others. They must be capable of certain online real-time experimentation to establish a particular combustion state point and then engine re-configuration to conform with the necessary fuel characteristics.

Ignition Modes

Traditionally there have been four primary modes of operation for reciprocating internal combustion engines: spark ignition (SI), homogeneous charge compression ignition (HCCI), compression ignition (CI) and dual fuel compression ignition (DFCI). SI and CI engines have been commercially dominant due to the more simplistic and inexpensive control systems required for satisfactory operation. Today's vehicle technology using computers is formidable and while sophisticated and expensive by yesterdays standards, the computer control systems of today are more capable and more competitive. Hence what is needed is to make use of this by making internal combustion engines smarter, harnessing the basic hardware available in an internal combustion engine to solve more real world problems.

The Spark Ignition (SI) Engine

The combustion process usually starts in the center of the cylinder, after which the flame travels towards the cylinder walls. This means that SI combustion is characterized by a flame propagation process. Using a fixed air-fuel ratio means that load control is only possible by controlling the mass flow of air into the engine. The throttle that is used for this purpose gives rise to pumping losses and a reduction in efficiency; the major disadvantage of the SI engine is its low efficiency at part load. The compression ratio in Otto engines is limited by knock and can normally be found in the range from 8–12 contributing to the low efficiency.

Spark ignition (SI) engine operation involves ignition of a homogeneous or stratified mixture of air and readily vaporized high octane fuel, such as gasoline, using an electrical discharge (spark) from one or more ignition devices such as a sparkplug, located in the combustion chamber of the engine.

Ignition and combustion of the air-fuel mixture in SI engines is relatively slow, particularly at low loads, resulting in less than optimal thermal efficiency and fuel efficiency since only a portion of the fuel's energy is released at the point of maximum compression. Combustion of the air-fuel mixture begins at the sparkplug (under normal operating conditions). Since the flame has a single flame front, a finite period of time, which is dependent on many factors, is required for the flame (generated by the spark at the sparkplug) to propagate across the combustion chamber. The air-fuel mixture furthest from the sparkplug is ignited substantially later than the air-fuel mixture near the sparkplug. During flame propagation the pressure in the combustion chamber increases. The compressed air-fuel mixture furthest from the flame front is compressed to higher and higher values awaiting the flame. If the compression pressure and corresponding temperature of the air-fuel mixture awaiting the flame is sufficient, as well as the exposure time, the air-fuel mixture will auto-ignite before the flame reaches it. Auto-ignition of the air-fuel mixture results in very rapid rates of combustion generating high combustion pressures, rates of combustion pressure rise and combustion knock, which may cause engine damage depending on many factors. SI engines employ high octane fuels to minimize auto-ignition of the air-fuel mixture.

Homogeneous Charge Compression Ignition (HCCI)

Combining features from both spark-ignition and diesel engines, the Homogeneous Charge Compression Ignition (HCCI) engine is promising the high efficiency of a diesel engine with virtually no $NO_x$ or particulate emissions.

In the HCCI engine, fuel is homogeneously premixed with air, as in a spark-ignited engine, but with a high proportion of air to fuel. When the piston reaches its highest point, this lean fuel auto-ignites (spontaneously combusts) from compression heating, as in a diesel engine. But auto-ignition is what causes knock in a spark-ignited engine. Knock is undesirable in spark-ignited engines because it enhances heat transfer within the cylinder and may burn or damage the piston. But in an HCCI engine, with its high air-to-fuel ratio, knock does not damage the engine because the presence of excess air keeps the maximum temperature of the burned gases relatively low. When the danger of engine damage is eliminated, auto-ignition becomes a desirable mode of operation.

HCCI is very much fuel flexible, and like the Saab SVC engine, an HCCI engine could use a multitude of fuels. An HCCI engine could theoretically burn everything from diesel to natural gas simply by changing the compression ratio. However, diesel fuel would ignite with a compression ratio of 8:1, which is a problem because it reduces efficiency, while natural gas is difficult to ignite, igniting at a compression ratio of 19:1 or 20:1 but resulting in very high efficiency. It has been considered that variable-compression engine may be a way of controlling initiation of an HCCI cycle but no good way has found its way into an engine. Even the Saab uses spark ignition as a way of optimizing efficiency in the low-power range where most driving occurs. What is needed is an engine that can run in SI or HCCI modes to fully optimize the efficiency of an engine.

In an HCCI engine heat transfer in a multi-cylinder engine is harder to stabilize, making it more difficult in finding ignition points. This presents a cylinder unique feature not addressable with current means of inflexible cylinder controls. In a multi-cylinder engine, one cylinder that is even 5° C. hotter than the other one, which is not very appreciable, may be enough for it to burn way in advance of the other cylinders. Perhaps even the colder cylinders won't burn at all under those constrained compression ratio conditions. What is needed are ways to independently control cylinder unit compression ratios for those cylinder unique compression ratios with varied temperature ignition points.

DFCI Engines

For an efficient power stroke, auto-ignition must occur almost exactly at the point where the piston reaches its maximum height within the cylinder. Timing of auto-ignition is thus critical, but the HCCI engine gives up two timing control mechanisms: The start of ignition is not directly controlled by an external event such as the beginning of injection in the standard diesel or the sparking of the spark plug; and the heat release rate is not controlled by either the rate and duration of the fuel-injection process, as in the diesel engine, or by the turbulent flame propagation time, as in the spark-ignited engine. Detailed modeling of engines using a homogeneous charge of various fuels has shown that by knowing the precise conditions (fuel species, temperature, and density) at the start of compression, the beginning of combustion can be accurately predicted. But heretofore, the control problem is what keeps the HCCI out of the auto showroom, because these parameters are only established by computer codes and simulation. What are needed are smart internal combustion engines which can determine fuel characteristics in real-time and use that information to set the optimal engine control parameters and mode of engine operation to accommodate for that given unknown particular fuel. These would be coupled with computer controls and logic which, using tests and real-time analysis on the unknown incoming fuel, would determine the regions of best operation and reconfigure the engine parameters to accommodate that particular fuel with least engine damage and maximum fuel efficiency. What are needed are engines that can burn alternate fuels smart, efficiently and within tolerable engine wear parameters.

Compression Ignition (CI) or the Diesel Engine

Diesel engines operate at higher compression ratios (12–24) than SI engines. In this type of engines, varying the amount of Diesel fuel injected into the cylinder controls the load. Instead of ignition by a spark plug, the air-fuel mixture self-ignites due to compression. The processes that occur from the moment the liquid fuel leaves the injector nozzles until the fuel starts to burn are complicated; droplet formation, collisions, break-up, evaporation and vapor diffusion are some of the processes that take place. The rate of the combustion process is generally limited by these processes; a part of the air and fuel will be premixed and burn fast, but for the largest fraction of the fuel the time scale of evaporation, diffusion, etc. is larger than the chemical time scale. Liquid fuel that does only partially burn results in soot formation. Together with NOx, the emissions of soot characterize the diesel combustion process. For present engines, a trade-off between these two emissions is observed, which poses a major challenge to comply with future legislation for both emissions. The major advantages of the Diesel compared with the SI engine are the low pumping losses, due to the lack of a throttle, and a higher compression ratio, leading together to higher efficiency.

The advantages of SI over CI are lower cost because of higher production volumes. The advantages of CI over SI are higher fuel efficiency, higher power and durability. If the SI engine were subsumed in the CI engine, the CI engine would gain the lower cost due to higher volume. The disadvantages of SI are its low part-load efficiency and knock limited compression ratio. The disadvantages of CI over SI are noisier engines and high emissions of NOx and soot. Either way, the engines are designed around the method of fuel ignition for a particular fuel. What are needed are engine designs that configure themselves for the optimum use of available fuel. These would add utility and flexibility having the capability to run on gas, diesel, hydrogen etc and engine owners would not be constrained to a particular fuel burning vehicle.

CI engine operation is similar to HCCI operation in that a spark is not employed and auto-ignition of the fuel is accomplished by high compression pressures and temperatures. In addition, engine load and speed control is accomplished by controlling the quantity of fuel which enters the combustion chamber. The quantity of air supplied to the engine is not throttled to control engine load and speed as is done with SI engines.

However, unlike HCCI and SI engines, CI engines operate on low octane fuel, primarily diesel fuel. Low octane fuel such as diesel fuel is typically given a cetane value instead of an octane value. The cetane rating is the direct opposite of the octane rating since the cetane rating is a measure of a fuel's tendency towards auto-ignition. Higher cetane values indicate reduced resistance to auto-ignition and correspond to lower octane values. Commercial diesel fuel has a moderate cetane value in the range of 37 to 55 with most diesel fuel being sold with a cetane value of 40 to 47.

During CI operation only air is compressed during the majority of the compression process and as such very high compression pressures can be employed. Near the end of the compression process, injection of the fuel (under high pressure) into the combustion chamber is initiated. Ignition of the diesel fuel is not instantaneous upon injection into the combustion chamber. A period of time, referred to as the ignition delay period, exists between injection of the diesel fuel and the onset of combustion. The ignition delay period depends on numerous factors including engine speed, compression pressure and temperature, the quantity of diesel fuel injected and the cetane value of the diesel fuel. Ignition delay decreases with increasing compression pressure and temperature, increasing fuel cetane value, increasing quantity of fuel injected and decreasing engine speed.

The ignition delay period for CI engines typically ranges from 5 to 25 crankshaft degrees depending on the type of engine, engine speed/load, compression pressures and temperatures and the cetane value of the diesel fuel. During injection of the diesel fuel prior to ignition, the fuel begins to disperse and mix with the combustion air. If the ignition delay period is decreased, less air-fuel mixing occurs prior to ignition such that the combustion rate is reduced and rates of combustion pressure rise are low, minimizing combustion knock. If the ignition delay period is increased, more air-fuel mixing occurs prior to ignition such that the combustion rate is increased and rates of combustion pressure rise are high, generating significant combustion knock and engine stresses. At higher loads additional fuel is injected after ignition of the fuel in the combustion chamber. The rate of combustion of the additional fuel is controlled by the rate of injection. Although CI combustion occurs by autoignition, ignition of the fuel occurs with only partial mixing of the air and fuel, such that combustion is relatively slow in comparison to HCCI combustion in which the air and fuel are thoroughly mixed. In addition, ignition of the fuel occurs gradually since the fuel is injected into the combustion chamber over a finite period of time during the combustion process. As such CI combustion can generate high loads with peak combustion pressures, rates of combustion pressure rise and levels of combustion knock which are significantly lower than for typical HCCI combustion.

The CI combustion process generates higher thermal efficiency and fuel efficiency than the SI combustion process, due to higher compression pressures. In addition, less energy is required to induct air into the engine at low loads since the combustion air is not throttled to control load as is done with SI engines. CI engines can be operated satisfactorily throughout the range of low to high loads.

However, CI engines typically generate less power and engine speed than comparable displacement SI engines. The CI ignition and combustion processes are slow resulting in a reduction in combustion efficiency at moderate to high engine speeds. In addition, since the air and fuel are not thoroughly mixed prior to the combustion process, not all of the air is fully utilized for output power in a CI engine. The high combustion pressures generated in the CI engine and localized rich air-fuel mixtures also tend to generate higher NOx and particulate matter (PM) emissions than SI and HCCI engines.

HCCI methods also have disadvantages. In an HCCI multi-cylinder engine, any cylinder even 5° C. hotter than another one, not very much by engine standards, may be enough for that one cylinder to burn way ahead of the other cylinders, or perhaps the colder cylinders will not burn at all in accommodating the hot cylinder. Thus what is needed are ways to control cylinder compression ratios independently of other cylinders, so that small variations in compression ratio requirements due to small temperature differences across cylinders can be controlled without the constraint of uniform compression ratio for all cylinders.

Together with ignition timing concerns, the power output from an HCCI engine would be lower than an equal size diesel because the peak pressure limits how much power you can get from a given engine block. Because of the high peak pressure, an HCCI engine would need to reduce its output below a diesel of the same displacement. Thus what is needed is an engine which could run in CI or HCCI modes, depending on the type of fuel used and accommodating engine design.

Since turbulence plays no helpful role in HCCI combustion, ignition falls mainly into fuel chemical kinetics. A UC Berkeley team studying HCCI performance through computer models, divided the cylinder into 10 temperature zones, which were enough to predict maximum pressure, burn duration, indicated efficiency, and combustion efficiency. These results were verified experimentally on a single-cylinder engine operating on natural gas as data from the experiment and the computer model correlated closely.

For an effective HCCI engine, what is needed is a smart engine which can use the data developed from computer models and simulations providing empirical data to help improve the fuel combustion algorithms to converge to the best ignition temperature and pressure state sufficiently fast enough to adjust engine parameters to effectively control the engine. In a paper presented at Windsor Workshop 2000 Transportation Fuels ATF Engine Management Systems Session Toronto, ON, Jun. 6, 2000, by Jan-Roger Linna et. al, "The Holy Grail of Internal Combustion Engines . . . " computer calculations for natural gas fuel combustion characteristics and experimental validation results were published. This kind of data on alternate fuel for combustion can be used to design smart internal combustion engines that can accommodate the burn characteristics of natural gas and it's family of characteristically related fuels.

Dual Fuel Engines

Dual fuel combustion ignition (DFCI) engines are typically low speed engines operated on a combination of natural gas and diesel fuel. Natural gas has historically been less expensive than diesel fuel and provides for cleaner combustion with reduced emissions. Engine load and speed control is primarily accomplished by controlling the combined quantity of natural gas and diesel fuel which are combusted with the air in the combustion chamber. In most applications the engine is operated as a conventional single fuel CI engine on diesel fuel at low loads. At higher loads natural gas is entrained into the air inducted into the combustion chamber, providing a homogeneous charge of air and natural gas to the combustion chamber. Auto-ignition of the natural gas by compression pressure and temperature is avoided by providing lean mixtures of air/natural gas. Lean air-fuel mixtures have a higher resistance to auto-ignition than stoichiometric air-fuel mixtures. Near the end of the compression process a small quantity of diesel fuel is injected into the combustion chamber through a pilot injector.

As previously discussed with regard to CI engines, ignition of the diesel fuel is not instantaneous upon injection into the combustion chamber. A period of time, referred to as the ignition delay period, exists between injection of the diesel fuel and the onset of combustion of the diesel fuel. The air/natural gas mixture contributes the majority of the energy to the combustion process at high loads. As such the quantity of pilot diesel fuel supplied for ignition purposes is relatively small in comparison to high load single fuel CI operation. The small quantity of pilot diesel fuel injected further increases the ignition delay period such that the pilot diesel fuel must be injected into the combustion chamber earlier in the compression process at maximum engine load and speed than would be the case for single fuel CI operation. Upon completion of the ignition delay period, ignition of the diesel fuel occurs and in turn causes ignition of the lean homogeneous air/natural gas mixture.

DFCI engines like CI diesel engines must operate at slower engine speeds than SI engines due to the lengthy ignition delay period of the diesel fuel and the slower combustion process. The ignition delay period can be reduced somewhat for CI engines as engine speed increases by increasing compression pressures through turbo-charging. However, increasing compression pressures to reduce ignition delay in a DFCI engine would cause unwanted instantaneous auto-ignition of the homogeneous air/natural gas mixture during the compression process, resulting in excessive combustion pressures and rates of combustion pressure rise. As such DFCI engine speeds tend to be more limited than for CI engines. Exhaust NOx and PM emissions at loads and speeds in which natural gas and diesel fuel are supplied to the combustion chamber are lower than for CI operation on diesel fuel alone.

The DFCI fuel control system is necessarily more complex than for SI and CI engines since the quantity and timing of two fuels entering the combustion chamber must be controlled. In addition, since instantaneous auto-ignition of the air/natural gas could result in excessive combustion pressures and rates of pressure rise, the control system must be capable of detecting auto-ignition and adjusting both fuel supplies accordingly to eliminate auto-ignition. Due to the complexity and corresponding cost of the DFCI natural gas/diesel fuel systems and limited range of engine operating speeds for efficient combustion, commercial applications have typically been applied to large low speed engines such as locomotive and stationary generator engines. Limited bus and truck fleet applications have also been commercialized.

What is needed are internal combustion engines which use methods to test for whether the fuel is optimally burned through SI, CI, or HCCI mode and to derive the characteristics of the fuel and apply control parameters and engine configuration which burns the given fuel efficiency and causes tolerable wear to the engine.

Detonation or Knock Background

U.S. Pat. No. 6,560,526—Matekunas, et al, Onboard misfire, partial-burn detection and spark-retard control using cylinder pressure sensing, is a recent invention entering the engine controls arena.

In '526 a ratio of the actual pressure to the motored pressure in the cylinder at one or more predetermined crank angles is used to estimate the fraction of fuel burned which, in turn, enables a determination of combustion failure in the cylinder cycle. Confirmation of said misfire or unacceptable partial burn leads to correction of engine operation by the controller and/or to a diagnosis of possible damage to the vehicle's catalytic converter.

Individual-cylinder pressure-based feedback has been shown to optimize engine operation using cylinder pressure as a fundamental combustion variable that is used to characterize the combustion process for each combustion event. Furthermore, it has been demonstrated that optimal engine control can be maintained by monitoring the pressure in each cylinder and using that information for feedback control of spark timing, exhaust gas re-circulation (EGR), air-fuel ratio (A/F), fuel balancing between cylinders, and combustion knock.

Matekunas proposes (see U.S. Pat. Nos. 4,621,603; 4,622,939 and 4,624,229) a methodology called "pressure-ratio management" which can be used in computer-based, closed-loop, engine-combustion control to better manage air-fuel ratio, including fuel balance between cylinders, ignition timing and EGR dilution, respectively. Matekunas' pressure-ratio management (PRM) involves computer-based engine controls and control algorithms which are facilitated by the availability of a production-viable, reliable cylinder-pressure sensor. The PRM methods require only a signal that has a linear relationship to the cylinder pressure without knowledge of either the gain or the offset of the cylinder pressure related signal. This provides the potential of applying sensors which need not be calibrated and which may measure pressure by means that are less direct than those sensors that must be exposed to the combustion gases in the engine cylinder. Such a sensor is a non-intrusive device called the "spark-plug boss" cylinder-pressure sensor as disclosed in U.S. Pat. No. 4,969,352.

PRM uses pressure data from one or more individual engine cylinders, at specified piston positions and corresponding known cylinder volumes. The fundamental basis for the data used is in the form of the ratio of the fired cylinder pressure and the pressure that would exist in the cylinder due to the presence of an air and fuel mixture if combustion did not occur. Pressure ratio is calculated for a piston position in terms of the current crank angle position.

However, the PRM is used to estimate the fraction of fuel burn to the exhaust re-circulation. Although PRM holds some advantages for controlling an engine using spark timing, exhaust gas re-circulation (EGR), air-fuel ratio (A/F), fuel balancing between cylinders, and combustion knock, it does so for tuning or optimizing purposes using EGR. Knock signals are simply treated without recognition for the phenomena complexity, adverse affects on engines or waveform analysis for other combustion characteristics. Cylinder valve timing and control is still constrained by a camshaft, and thus cylinder independent control is limited. Also, Matekunas addresses the harm potential to the catalytic converter, which is handled with more care. Temperature differences across the individual cylinders are not accounted for except for in air-fuel ratio. Furthermore, the main valve control is done via the traditional "hardwired" camshaft. What are needed are more versatile and direct methods to control individual cylinder mixture states and methods of extracting more information from cylinder fuel combustion, information which can be used in real-time to give the engine more versatility.

'526 teaches that PRM methods require only a signal that has a linear relationship to the cylinder pressure without knowledge of either the gain or the offset of the cylinder pressure related signal. That PRM pressure data is used in the form of the ratio of the fired cylinder pressure and the "motored pressure." Thus, the PRM filters out most of the detonation knock signal. What are needed are methods of extracting more information from detonation signals for not only general knock reduction, which has been recognized and accomplished for current engines to an extent, but for algorithms which employ more sophisticated computer techniques to obtain additional advantages and promote alternate engine uses, functions with allow engines to not only have cleaner burns and protect the catalytic converter, but determine combustion characteristics by in situ experimentation and to re-configure themselves to operate in completely diverse air-fuel operating ranges to accommodate more than just one fuel operation, as well as providing cleaner burns and catalytic converter protection.

Knocking occurs when the flame from the spark plug does not consume the gases in the piston chamber fast enough or uniformly. The remaining "end gases" spontaneously combust, sending a damaging shock wave across the chamber. Engines operate most efficiently at the highest compression ratios, but that is precisely where knocking occurs also. Engine knock therefore sets an upper limit to the compression ratio at which a spark-ignited internal combustion engine can operate. Suppressing knock permits engines to operate at higher compression ratios and thus to achieve higher fuel efficiency and lower carbon dioxide emissions. In other ignition modes where fuel droplets of non-uniform size ignite out of concert with the flame front, knocking can also occur.

There are many methods for detecting and processing engine knock as it is a common engine problem. Wholesale computer oriented solutions such as data-driven fuel classification, time frequency analysis of combustion characteristics and computational fuel combustion kinetics are single study, single fuel limited. The sensor, detection and processing of knock signals is currently available. What is needed are engines capable of adjusting combustion parameters to ignite mixture in real-time, which minimize alternate secondary flame fronts and detonation waves causing knock. What are needed are engine controls systems which can detect, adequately recognize damage potential from the engine knock and alter engine combustion to an operating regime outside the damage zone, using available fuels. What is needed is to solve the vehicle to fuel type mismatch problem, the main problem of going to a hydrogen fuel economy where vehicles cannot always obtain hydrogen fuel and can rely on available gas or diesel sources where hydrogen fuel sources are not yet available.

SUMMARY OF THE INVENTION

An internal combustion engine with electronically controlled engine components is programmed to operate individual engine cylinder component states and stoke sequences that, with feedback from detonation signals, provide for the use of variable fuels for engine operation. By conducting in situ cylinder combustion tests on a give fuel in real-time, and a utilizing a computer control system, suites of tests for various ignition modes are made on the fuel to ascertain its combustion characteristics and based on these tests, an engine is reconfigured to optimally run in an ignition scheme which produces the highest power under allowable engine integrity constraints.

A programmable internal combustion engine is re-configured to operate with any given fuel from a range of combustible fuels. The engine comprises cylinder units each with expanding and contracting cylinder volume and associated stroke sequences, each cylinder unit having an intake port and an electronically controllable intake valve component having multiple states under computer control, each cylinder unit having an exhaust port and an electronically controllable exhaust valve component having multiple states under computer control, each cylinder unit having an electronic fuel injector component having multiple states under computer control, each cylinder unit having selectable computer controlled means for igniting an air-fuel mixture in the cylinder volume, a computer usable medium and a computer control system comprising computer readable program logic embodied in the computer usable medium for controlling individual cylinder units by actuation of cylinder components through programmed sequences of states and strokes providing detonation signals from fuel combustion, one or more sensors for sensing detonation signals, detonation signals computationally processed for identified parameters which are stored in computer usable media, identified parameters representative of power developed from combustion events are used to determine governing configuration, whereby identified parameter results determine ignition method and cylinder component state sequences in re-configuring cylinder units for engine power operation combusting a given fuel.

BRIEF DESCRIPTION OF THE DRAWINGS

These and other features and advantages of the present invention will become more apparent to those skilled in the art from the following detailed description in conjunction with the appended drawings in which.

DESCRIPTION OF THE PREFERRED EMBODIMENT

Figure 1:
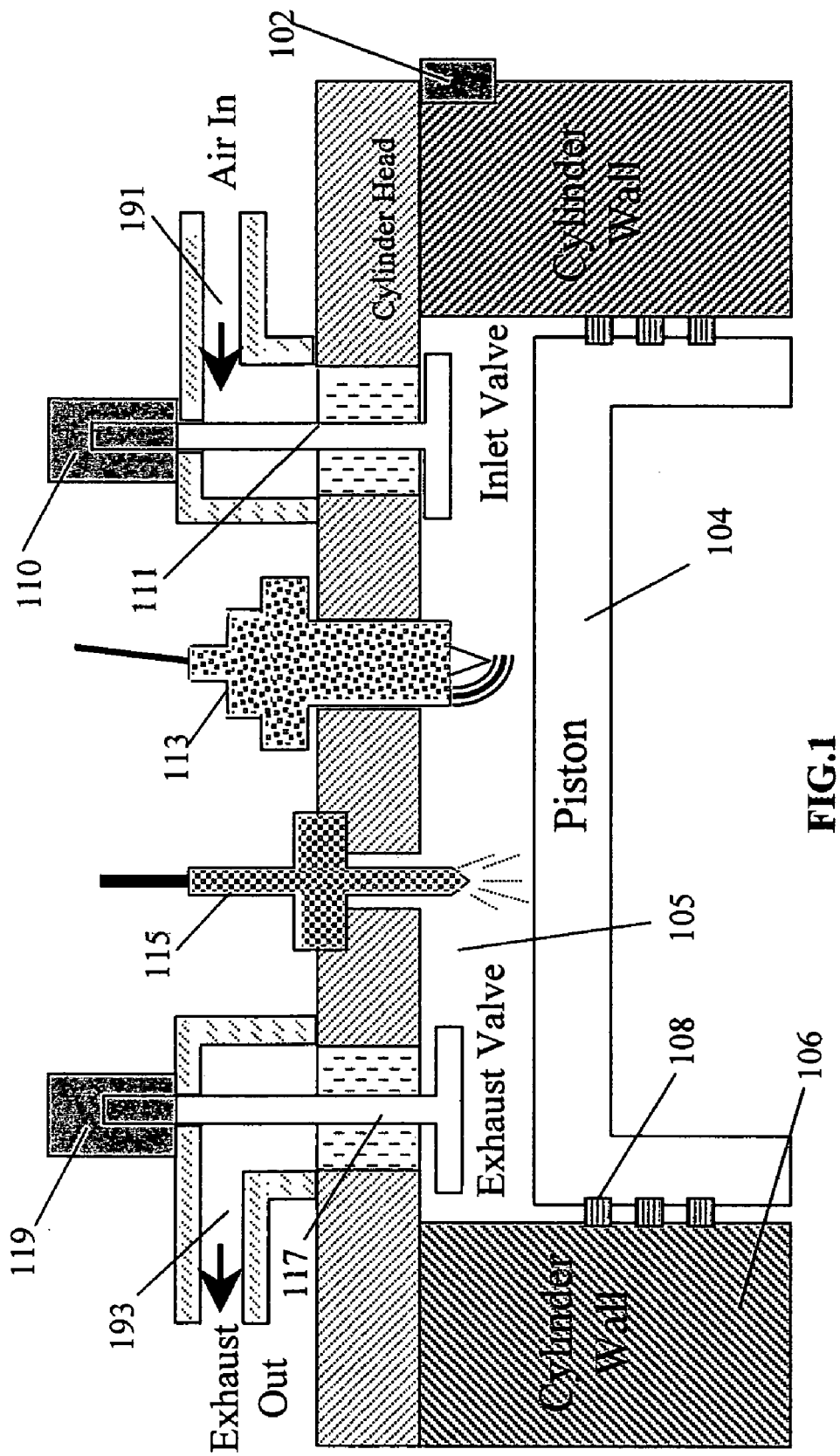
FIG. 1 is an engine cutout view illustrating a Adaptive Variable Fuel Internal Combustion Engine (AVFIC) engine cylinder unit in accordance with an embodiment of the present invention.

An internal combustion engine designed to run on most combustible fuels is presented. Br removing the camshaft and electronically controlling cylinder valves and other cylinder components and stroke sequences, a programmable internal combustion engine is created to perform any number of useful functions in addition to applying power to a crankshaft. In an aspect of the invention, using computer controlled electronic fuel injection, electronic ignition, and electronic intake and exhaust valve actuation of cylinder unit components, an internal combustion engine with independently controlled cylinder units each having fuel consumption, ignition timing, air intake, exhaust outflow, and variable effective stroke length, fuel combustion is controlled in situ and in real-time to configure the cylinder components to perform a programmed series of tests or combustion events on a given fuel. These combustion events provide detonation signals that contain combustion characteristics. The signal as identifiable parameters which are combustion characteristics which are representative of combustion power, piston work, rate of fuel burn, alternate mixture detonations, and energy deposition potential likely to cause cylinder damage, are extracted from the and systematically examined against set criteria and other test results to determine which combustion event or test offers the optimal fuel performance. Once the best test if found, the component settings and sequences used in the test are applied to run the engine in the best mode for the particular fuel tested.

In achieving that, the engine cylinder design accommodates a range of compression ratios through a sufficiently long cylinder stroke, such that the creation of a continuum of compression volumes is possible through the electronic control of cylinder valve states. However, mechanical limitations are physically constrained by an upper limit of compression ratio using the entire cylinder stroke, intake valve open for the full duration of the intake stroke.

An aspect of the invention provides a programmable computer system for starting, transitioning and controlling individual cylinder units for virtually concurrently, at computer processing speeds, for selected modes of air-fuel mixture ignition with various ignition tests in each mode, running tests using independently controlled cylinder units. Each test or programmed combustion event provides a detonation signal which is converted and processed for characteristics or parameter numerical value which are used in determining the best mode of operation. The test values are algorithmically processed via an aspect of the invention for acceptable power within tolerable cylinder pressure-temperature limits. Tests are programmed to use another aspect of the invention, variable ignition, which is also programmably applied in scheduling test sequences for determining which ignition mode and associated components states produce the optimum cylinder power. Component settings from the best test are used to systematically reconfigure the engine for an optimal power operation mode, wherein a mode is comprised of settable cylinder unit component states, sequences of strokes and computer programmed duty cycles. Modes of operation are selected from sets of ignition tests to determine a given fuels combustion characteristics and include knock mitigation processes. The ignition means include but are not limited to spark ignition (SI), combustion ignition (CI), homogeneous charge compression ignition (HCCI) and combinations of these.

The engine is configured to run with the given fuel in the best power mode for that particular fuel until a different fuel is introduced. Tests can be administered at engine start where a given fuel is yet untested for combustion characteristics, occurring at engine startup requiring cranking by external source such as a starter motor. Essentially, the engine is controlled to act as a laboratory with series and suites of tests programmably controlled to determine the least engine damaging ignition method to use by the engine that will yield the highest crankshaft power output for a particular fuel. This can be done in stages with the first test series using best guess approaches from matching known fuel combustion characteristics from control system memory which are commonly used fuels. The initial tests from cold starts may be achieved under cranking engine revolutions and refined once the best ignition mode is established.

Although fuel burn rate, air-fuel mixture ratios, corrosion and deposit formation, stochiometry, emissions and other factors affect engine ware, the cylinder state conditions of temperature and pressure are the first order combustion measurable parameters affecting engine cylinder power output as well as cylinder damage. Therefore sensor data for the fundamental mode of operation focuses on those signal parameters for fuel combustion characteristics and damage criteria evaluation. These are established by parsing the signal waveforms for characteristics indicative of maximum power and detrimental engine phenomena. The method establishing best mode is outlined in the FIG. 4 narrative.

Dynamically Re-configurable Internal Combustion Engine Basics

FIG. 1 is an engine cutout view illustrating an internal combustion engine cylinder unit in accordance with an embodiment of the present invention. The cylinder 106, piston ring 108, piston 104, detonation sensors 102, cylinder expandable volume 105, exhaust valve 117 and air inlet valves 111, fuel injector 115, fuel mixture igniter 113, air intake 191, exhaust manifold 193, electronic actuation devices 110 119 comprise a Cylinder-Piston Compression-Power Unit (CPCPU) in a preferred embodiment. Specifically, a CPCPU is controlled by electronic fuel ignition, direct ignition by spark and fuel injection into compressed state, and indirect ignition by mixture compression through electronic means of controlling exhaust and inlet valve states.

In an embodiment of the invention, the engine design basis cylinder and displacement requirements must accommodate the fuel that would require the ceiling compression ratio expected to be used in fuel combustion. Thus, if the fuel types to be burned are to include natural gas, hydrogen, diesel, gas, gasohol, and combinations of those, then the cylinder-block design would accommodate the natural gas compression ratio minimum of 21:1 for spontaneous combustion. Thus does not dictate that variable compression ratio is necessary for compression ignition mode, which could start at 25:1 for diesel fuel, only that a longer stroke is necessary for variable compression by electronic valve control, and the full length of the stroke provides the embodiment ceiling compression ratio.

Camless Electronically Controlled Inlet and Exhaust Valves

It cannot be overstated that electronic control of the engine is an element of the invention, and this begins with engine components, which provide the functionality to provide the controls necessary. An aspect of the invention uses camless intake and exhaust valves under an electronic control system. Camless valves are commercially available. Valve motion can be effectuated electronically in several ways, solenoid actuation or fast-acting electro hydraulic. In one preferred embodiment of the AVRIC engine, the inlet 111 and exhaust 117 valves use solenoid actuation 110 119 respectively. In another embodiment, a fast-acting electro hydraulic actuator under the control of an electronically controlled digital valve is used to provide the mechanical power for valve actuation. Engine inlet and exhaust valves and associated electronic actuators are CPCPU specific components whose open-close states are controlled by a computer control system. Much of engine timing is couched in "cam angle" terms because cam angle directly controls the valve opening in engines with cams. Cam angle is a reference vestige of a camshaft of which there is none in the present invention. Here it is directly related to the crankshaft by engine design, and "cam angle" where used is a direct function of crankshaft angle.

Several electronically controlled valve designs have emerged strating in the space industry. Sturman, U.S. Pat. No. 6,360,728, has introduced a fast-acting electro-hydraulic actuators which provide mechanical means for valve actuation under the control of an electronic assembly. Solenoid actuated two-way spool valves can also be actuated by digital pulses provided by an electronic assembly.

Air-Fuel Mixture Ignition

In an aspect of the invention, the air-fuel mixture ignition method is programmably selectable and is shown for spark ignition (SI), compression ignition (CI) or homogenous charge compression ignition (HCCI). In a SI embodiment CPCPU, the fuel mixture igniter 113 receives a signal to ignite the air-fuel mixture in power mode generally near top dead center (TDC) of the power stroke specifically adjusted to a particular fuel combustion profile. In this embodiment of the invention, a solid-state electronic ignition system is used in conjunction with electronic sensor signals and feedback signals to a central ignition module to produce a spark of a precise duration and time to a particular CPCPU in accordance with the engine mode and associated timing required for the SI mode. These provide the means to introduce spark to ignite the air fuel mixture by computer control and are known to one skilled in the art.

In HCCI and CI, combustion initiation is controlled by compression ratio and fuel injection time respectively. These control parameters are implemented by electronically controlling valve timing and fuel injection time respectively, with additional secondary factors such as fuel dispersion, temperature and surface effects also affecting ignition timing. Thus all the combustion modes have a primary ignition means, which is controllable and variable.

General Knock Factors

Engine knock occurs where cylinder pressure and temperature are sufficiently high and combustion in the cylinder is occurring uniformly, yet unburned air-fuel mixture spontaneously ignites generating alternate combustion wavefronts which propagate and present counteracting disturbances causing cylinder damage. Several factors that affect the fuel burn characteristics and cylinder temperature and pressure are; engine compression ratio, spark advance, pre-ignition, combustion chamber design, spontaneous ignition of mixture by temperature variance.

If the mixture compression is increased, then knock is more likely to occur. Thus, higher engine compression will cause knock to be more likely at least for the typical octane fuels. In an aspect of the present invention, inlet and outlet valve timing control the engine compression ratio. Typically, the larger the total intake valve open state duration on intake stroke, the larger compression ratio will result. The intake valve open state, all other factors remaining similar, is directly related to the cylinder compression ratio. Alternatively, the exhaust valve open state duration at beginning of compression stroke can also regulate effective cylinder volume, pushing out air until the required volume to be compressed is achieved and then closing the exhaust valve for compression stroke remaining.

In SI, the maximum pressure and temperature in the cylinder rises to a peak occurring some time after the spark initiation. The fuel mixture burn profile is a generally monotonically increasing locus that reaches a peak and then decreases. If the ignition spark is delayed so that this maximum pressure occurs after TDC, the downward motion of the piston increase volume and reduces the pressure rise from combustion, causing the maximum pressure to be lower. Thus, retarding the spark causes knock to be less likely, advancing the spark increases chances of knock to occur in a certain range.

Pre-ignition and post-ignition from hot spots and surface deposits has the same effect in generating engine knock as increasing the spark advance, it causes knock phenomena and resulting CPCPU damage. Any solution must include a method to remedy these affects.

Several CPCPU design solutions are known. First, if the distance from the spark plug to the far corners of the combustion chamber is reduced, combustion occurs more quickly. This increases the power, and also reduces the amount of time that knock has to occur. Second, if the exhaust valve is placed close to the spark plug it will not heat up the later unburned gas as much, and thus will reduce the likelihood of knock. Third, cooler areas such as the intake valve and areas close to both the piston and cylinder head can be placed in the parts of the cylinder that burn last, thus cooling this unburned gas and reducing knock. Finally, increasing the turbulence in the engine (up to a point) increases the burn rate and thus reduces knock. Turbulence can be increased by valve design or by creating areas of mixture that are squeezed between the piston and head, and are forced at high velocity into the middle of the combustion chamber. These factors are all determined at design time and remain static there after, regardless of fuel used and are known by them skilled in the art.

In SI engines, if the fuel is able to withstand higher temperatures before spontaneous ignition, it will clearly be less likely to knock. The resistance of fuel to knocking is qualified in the Octane rating, the higher the octane the higher compression the engine cylinder can produce for optimum fuel burn without knock. In CI engines, higher Cetane ratings are preferred because those fuels are easier to ignite and the fuel injection into the combustion state produces ignition. A blend of the two types of fuels will have characteristics somewhere in between the octane and cetane and hence the HCCI mode may be preferred to minimize knock and maximize power out. In an aspect of the invention, the actual combustion characteristics are determined by testing the given fuel or fuel blend in situ.

The above known engine knock causing phenomena are integrated into test algorithms to determine optimum fuel combustion characteristics. Program logic is applied to adaptively iterate tests varying the primary control parameters for the various ignition methods, spark (SI) injection time (CI) and compression ratio (HCCI), retaining component settings for each ignition mode and parametric test within each ignition mode in memory. In an embodiment of the invention, each test's resultant parameters are compared first among a test suite results, and then across the ignition modes to determine which ignition mode and the associated optimal component parameters are to be used in configuring the engine for a particular fuel. The test resultant parameters are extracted from detonation signals and include knock intensity, frequency content, wave period, maximum stable burn wave pressure weighted against output torque or power generated for each particular test. These are accomplished in conjunction with any mitigation such as cleaning surfaces to reduce and eliminate the engine knock.

Electronic Fuel Injection

Processor controlled fuel injection systems are currently-designed and used by those skilled in the art for directing calculated fuel quantities to be injected into engine cylinders at prescribed times dictated by the test duty cycle. In an aspect of the invention, based on input sensor information, engine mode, selected CPCPU, stroke and duty cycle logic information, the computer control system directs the fuel injector 115 to inject the calculated quantity of fuel at the appropriate time and duration in accordance with a mode duty cycle based also in part on fuel injector characteristic parameters, crankshaft position and engine speed. Test modes will typically require smaller quantities of fuel and programming logic will direct metering of fuel quantities based on fuel liquid or gaseous state. Other conditions are programmed into the fuel injection control logic to ensure safety of the fuel handling, switching between fuel sources, testing modes or power modes. These are practical considerations for more complex embodiments.

A 4-CPCPU AVFIC Engine Embodiment

Figure 2:
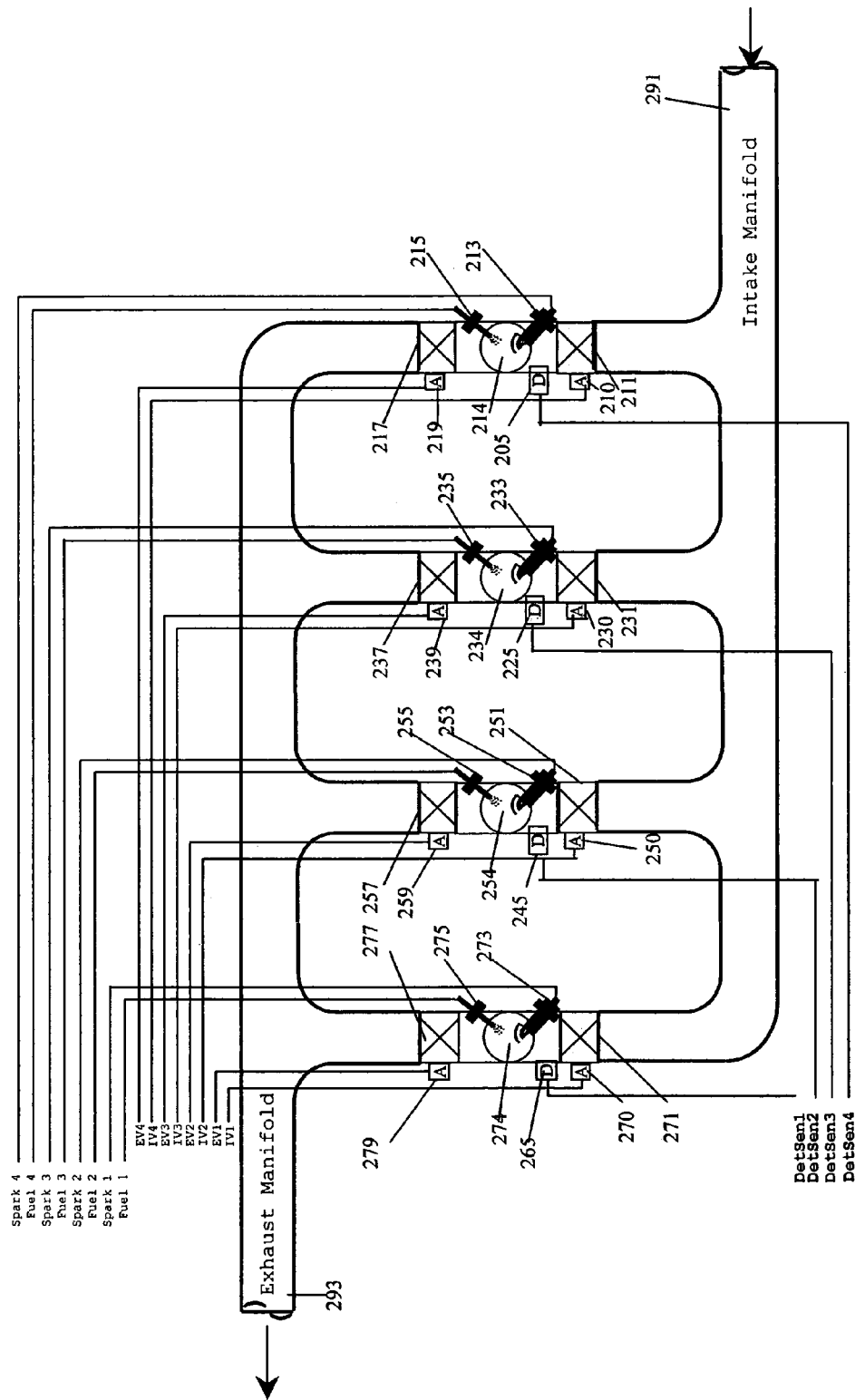
FIG. 2 is a high-level 4-cylinder unit engine system diagram of a AVFIC engine in accordance with an embodiment of the present invention.

FIG. 2 is high-level diagram of a 4 CPCPU AVFIC engine in accordance with an embodiment of the present invention. In the invention embodiment shown in FIG. 2, cylinders receive intake air from ambient air manifold 291. In power mode, cylinders work under a firing sequence that is controlled by programmable control logic, which accommodates a host of factors depending on fuel type, power required, vibration, engine knock, etc. This is notably distinguished from a preset unchangeable firing sequence constrained by mechanical design.

In an AVFIC embodiment, CPCPUs 214 234 254 274 are operated independently, but in concert with the crankshaft rotation. In a power mode utilizing all CPCPUs, intake air passes through the inlet valves 211 231 251 and 271 which are independently processor controlled through actuators 210 230 250 and 270 respectively. Inlet ambient air is mixed with fuel from injectors 215 235 255 275 respectively under processor control depending on a determined ignition mode. The power stroke is initiated with the compressed air-fuel mixture ignited by processor-controlled ignition through spark initiators 213 233 253 and 273 respectively, fuel injection time, or compression ignition time. CPCPU ignition mode, SI, CI, or HCCI, is also under programmed computer control and executed in accordance with a computer controlled firing sequence. Exhaust valves 217 237 257 277 are independently processor controlled through actuators 219 239 259 and 279 respectively and are opened to vent exhaust gas to exhaust manifold 293. Sensors 205 225 245 265 transmit detonation signals to local processing units but eventually to the control system I/O ports.

Engine Controller

Current model automobiles and trucks use multiple processors and some vehicles have thousands of lines of software, also known as program logic or code. There are many engine computer programming environments which those skilled in the art can use to program aspects of the invention; the engine control system, stoiciometry tables in digitized logic, empirical ignition parameter tables, mode duty cycles program logic and various other program logic. The engine control system is comprised of input sensors, electronic control modules to process those input signals, and stored logic which then signals mechanical actuators to convert output signals into physical action. A control module, referred to herein as computer or controller, can be comprised of such components as CPUs, controllers, micro controllers, processors, microprocessors, memory, distributed sub-modules, fiber and/or other electronic hardware.

Figure 3:
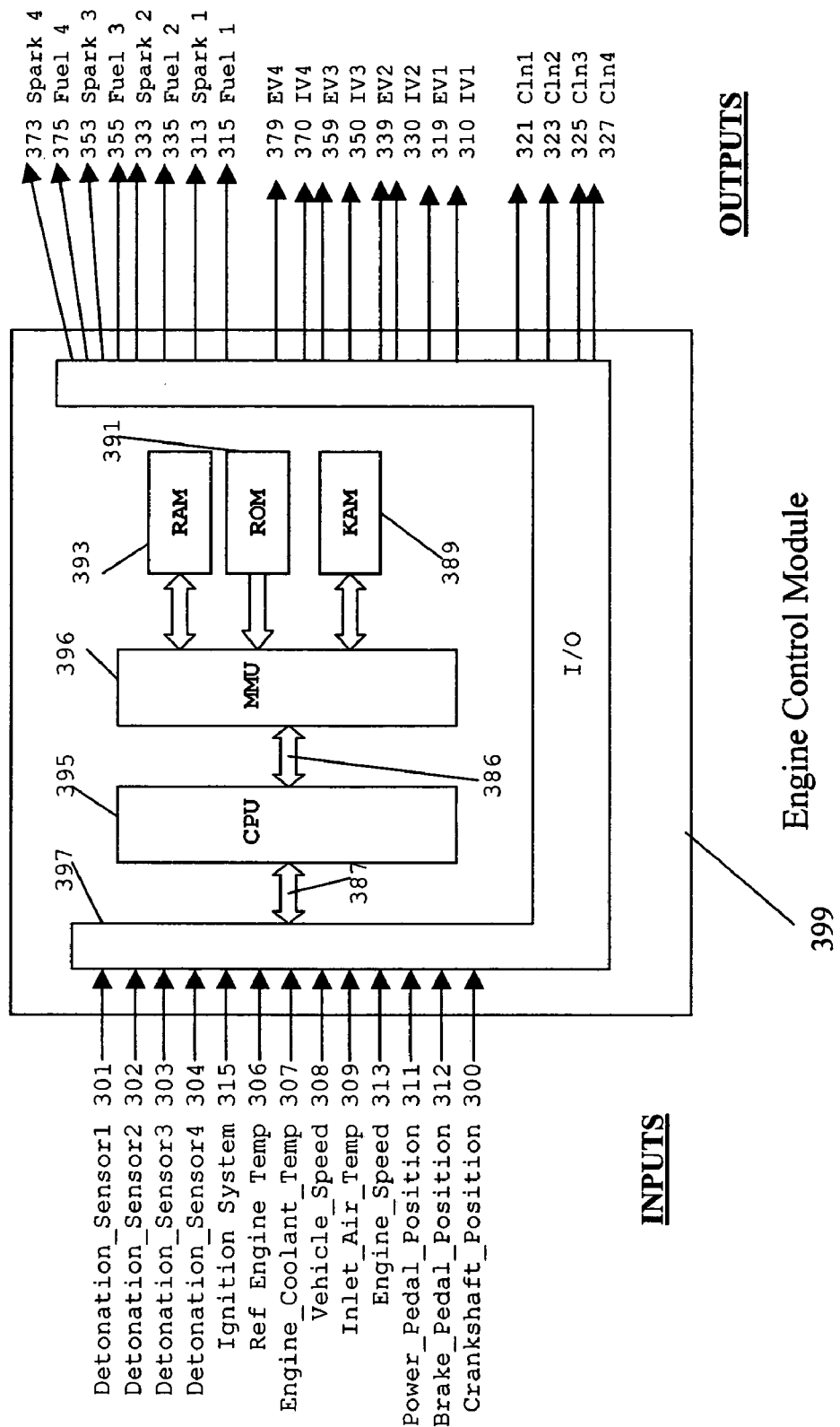
FIG. 3 shows a high level AVFIC engine controller block diagram in accordance with an embodiment of the present invention.

FIG. 3 shows engine control module 399 for an embodiment of the present invention for a AVRIC engine associated inputs and outputs from devices and sensors. As shown in FIG. 3, the engine control module 399 includes a computer or central processing unit (CPU) 395 in communication with computer readable storage devices 389, 391, and 393 via memory management unit (MMU) 396. The MMU 396 communicates data (including executable code instructions) to and from the CPU 395 and among the computer readable storage devices, which for example may include read-only memory (ROM) 391, random-access memory (RAM) 393, keep-alive memory (KAM) 389 and other memory devices required for volatile or non-volatile data storage, and data buses 387 386 of any suitable configuration. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical or combination of memory devices capable of storing data, including executable code, used by the CPU 395 for controlling the internal combustion engine and/or motor vehicle containing the internal combustion engine.

Memory Storage for Historical and Empirical Data

An aspect of the invention tests a given fuel for knock characteristics and other results based on engine cylinder test parameters and conditions. Thus a series of tests will be performed for each ignition mode and results compared to determine the optimum operation mode component configuration based on known engine parameter criteria. Therefore, adequate memory storage is required in processing the various test results. Also those tests indicating harm to engine can be marked and stored for later processing use, as regions to avoid in fuel test iterations in refinement stage tests, tests to get better performance parameters once the ignition mode has been selected and individual cylinder units are tested.

Input/Output

Hardware input/output (I/O) interface 397 is provided for communicating with various sensors, actuators and control circuits, including, but not limited to, the inputs shown in FIG. 3. These inputs include device and sensor signals such as Detonation Sensors 301 302 303 and 304, Ignition System 315, Reference Engine Temperature 306, Engine Coolant Temperature 307, Vehicle Speed 308, Inlet Air temperature sensor 309, Engine Speed sensor 313, Power Pedal Position 311, Brake Pedal Position 312, and Crankshaft Position 300. Input signals are used as real-time variables in conjunction with the programmed duty cycle and mode logic to control the CPCPU components in concert with cylinder unit piston position for creating variable stroke sequences.

The engine controller module 399 receives signals from a variety of sensors, such as the sensors discussed above, processes the input and controls operation of CPCPU components through outputs which control the states of the fuel injectors 315 335 355 375, Inlet Valves 310 330 350 370, Exhaust Valves 319 339 359 379, spark plugs 313 333 353 373 analogous to a FIG. 2 embodiment controlled CPCPU components. These outputs include Spark_4 373, Fuel_4 375, Spark_3 353, Fuel_3 355, Spark_2 333, Fuel_2 335, Spark_1 313, Fuel_1 315, EV4 379, IV4 370, EV3 359, IV3 350, EV2 339, IV2 330, EV1 319, IV1 310, A cleaner control Cln1 321 Cln2 323 Cln3 325 Cln4 327 may be used in some embodiments to execute injections or other fuel mixture burn commands to dissolve hot spot surface residue build up, but is only one of many solutions made possible from computational detection and diagnosis aspects of the invention.

Where Spark n represents the control line to the sub-module ignition for cylinder n, Fuel_n represents the control line to actuator assembly fuel injector in cylinder n, EVn represents the control line to actuator assembly camless exhaust valve in cylinder n, IVn represents the control line to actuator assembly camless inlet valve for cylinder n Clnn represents the actuation of surface residue solution to cylinder n.

The control and operation of CPCPU component states varies in accordance with the mode requirements, sensor input and engine parameters. Although CPCPU embodiments of the invention are described with components as having Boolean states of open/closed or on/off, this is done for illustration of simple cycle of operation purposes. In practical fact, this would be an approximation and the physical reality of actuating engine components, even though electronically controlled and the electronic processing and command initiation at CPU speeds, components have state transition characteristics, properties and response profiles which may impact the actual duty cycle timing. Thus, optimum operational results may require initiating component state transitions before or after the time dictated by the duty cycles in accordance with engine parameters. Valves and other mechanical components have characteristic open and close profiles despite designer best efforts to eliminate over and under shoot. Latencies from command execution to completed mechanical state transition must be addressed in any real application of the invention. Therefore, the component open-close state duty cycles and timing curves may appear different from those illustrating the simple fundamental modes of operation and yet suffice to accomplish the embodiment purpose.

Computational Processing for Identified Parameters

Sensors and devices provide information about engine operating parameters that affect the operation of the vehicle, the engine and engine mode of operation. The term "engine operating parameters" herein refers broadly to any engine operating parameter, including but not limited to engine operating parameters, which are sensed, computed, derived, interpolated or extrapolated from empirical tables, inferred or otherwise provided. An aspect of the invention is to obtain signals from sensors and subject them to computational processing to mathematically extract identified parameters which are used in conjunction with stored empirical data and or engineering and scientific models to ascertain the optimal operating conditions for a given fuel under time constraints. However, the algorithms and processing are not restricted to linear relationships, as non-linear relationships are more likely the rule and non-linear methods needed to discover the fuel combustion character and then to regulate engine operation conditions to comply with these for optimum engine performance.

In an embodiment using sensed data and empirical data with engineering heat flow and temperature models, the reference engine temperature sensor 306 in FIG. 3 provides sensed engine temperature reference data. Using the sensed temperature as a reference point and computer media stored empirical temperature profiles of engine operation at initial state to steady state conditions for a specific engine design; individual cylinder unit temperatures are numerically interpolated or estimated at engine locations, which do not have temperature sensors. The determined individual cylinder temperatures at cylinder locations that do not have temperature sensors are input parameters to models that estimate CR or cylinder pressure, which ultimately determine the individual cylinder component state settings. Thus knowing individual cylinder temperatures, cylinder compression ratio and therefore valve component states, fuel injection time and quantity and other configuration parameters may be derived, estimated, calculated or predicted from engineering models. Model input requirements vary from analytical closed form solutions, empirical interpolation or numerical methods and may require some input parameter values be engine-operating parameters from sensors, derived or calculated from actual sensed values or empirical extrapolations. Therefore, stored engine temperature profiles with sensed temperature data for reference are used to extrapolate specific engine location temperatures and extrapolated temperatures are used as initial condition parameters in estimating individual cylinder state conditions for setting specific cylinder component state, correcting for engine disparate temperatures where position temperature sensor signal not available.

Furthermore, the concurrency of processing inputs and outputs can fulfill the requirement to minimize the delay between processing and actuating components within real-time operating constraints. In more advanced embodiments of the invention, computational power may require that signals be preprocessed by adjunct distributed processors such as analog processors, DSPs or micro-controllers and parameter values processed locally, with data from previous related tests or other components. Other processing requiring the use of empirical data or other numerical processing logic, may include embodiments with additional numerical processors and memory hardware, acting more locally the computational need and or speed for real-time considerations. Lastly, complex actuated components may themselves have local assemblies with analog-to-digital or digital-to-analog circuits, controllers, programmable logic controllers, micro controllers, soft logic controllers and or processors for a more local, failsafe or immediate control of the managed component. These are all part of a distributed computer control system and act together to manage aspects of the invention.

The engine controller 399 is an input-output context diagram of the computer control system that symbolically includes computer readable program code embodied in a computer usable medium. The readable program is executable code and programmable logic embedded in various modules and sub-module component hardware. The programming and firmware embedment process is well known to those of ordinary skill in the art. The programmable portion will store engine mode information and control transition of the engine from one test configuration to another test configuration, or command that the engine operate in a mixed test mode.

Using sensor input variables in FIG. 3, and engine parameters which can be engine design parameters stored in the logic, the engine control system executes code which sets cylinder component states and tests a given fuel for combustion characteristics. Maximum allowable and threshold cylinder pressure values are scaled to measured values in alternate ways to adjust for suspect sensor readings.

In an embodiment of the invention, the different ignition mode tests are tasked to different cylinders and controlled virtually concurrently. For example, components states in cylinder x are set to carry out the SI mode tests, cylinder y component states are set to carry out the HCCI mode tests, etc all in concert with crankshaft position and individual piston positions. In another embodiment, a particular ignition mode test suite can progress through all of the cylinders methodically in a programmed firing order, followed by another ignition mode test suite.

Sensors may have distributed processing capabilities attached to provide quicker response in failsafe and local process logic capable conditions, logic that does not impair the overall function of the engine in under normal conditions, but does not compete for central processing time where the specific component is functioning at a physically lower level and a more automatic state response is required.

Figure 4:
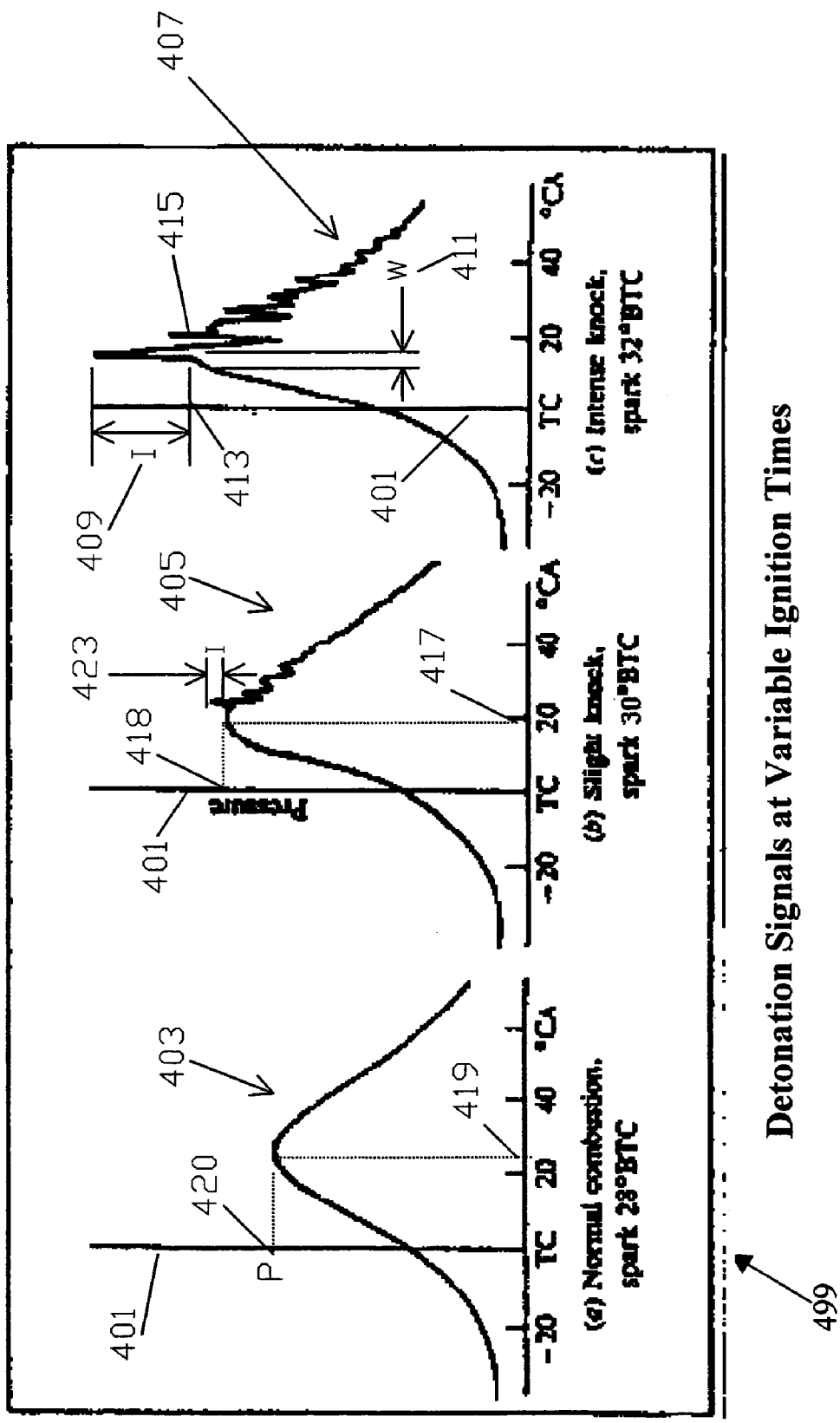
FIG. 4 is a graph illustrating cylinder pressure time histories for spark times relative to TDC in a three SI test iteration series according to an embodiment of the present invention.

FIG. 4 is a graph illustrating cylinder pressure profiles or time histories for ignition times relative to TDC in a suite of three incremental test iterations according to an embodiment of the present invention. FIG. 4 contains three SI detonation pressure time histories 403 405 and 407. While these graphs are detailed and well defined, they are also obtainable for engines fitted with proper sensors, signal processing and computer technology for programming, embedding, processing, and storing results. These are known to those skilled in the art.

To an approximation, the area under the general four-stroke cylinder-pressure graph in the power stroke represents the power developed in that combustion. This area bounded by the graph can be calculated by mathematical integration, provides a representative value of combustion work characteristics or cylinder power developed during a power stroke and is an identified parameter of the detonation signal. These representative parameter resultant values and engine parameters are used in an aspect of the invention, by identifying fuel combustion results for determining optimal cylinder combustion character when compared with design limits and other test results. Mathematical integration can be done by numerical, analytical, computational, digital or analog means and is known by those skilled in the art.

In a fundamental mode of operation, the cylinder peak pressure achieved, assuming that the combustion pressure curves are characteristically similar for a particular type of ignition and fuel type, are also representative of the power developed in the power stroke for that particular fuel type and ignition mode, and therefore peak pressure is another identified parameter of the detonation signal. In a first order approximation, to ascertain individual power developed during cylinder combustion, the peak pressure is extracted from the signal or pressure profile and used to represent the power developed in combustion for a particular cylinder power cycle. The vertical axis 401 plots pressure and the independent variable horizontal axis represents degrees of piston position centering on TDC. For this particular engine and this particular fuel, in the first test iteration 403, normal combustion is present when the fuel mixture is detonated 28° BTC. This test 403 iteration displays a detonation pressure peak 420 at approximately 25° after TC 419. In the second test iteration 405 profile shown, the spark detonation time is advanced to 30° BTC and the results in slight knock intensity 423 which manifests as a small transient on the detonation curve down slope just after detonation peak pressure 418 is achieved at 20° ATC 417. In the third test iteration 407, detonation time is incrementally decreased again by 2° to 32° BTC, intense knock develops as a much larger transient 409 on the detonation curve starting almost at the signal maximum pressure 413 and spiking characteristically upward. This is due to secondary detonation ensuing flame fronts which then collide and reverberate with the primary or spark initiated detonation flame front, forming a transient pressure signature which rides on what would otherwise be a smooth transition of monotonic decreasingly pressure as in the first test iteration 403. Associated with the signal maximum indicative pressure is the highest knock intensity I 409 which has an associated period w 411 at the knock transient's base, a significant divergence from the preferred stable monotonically decreasing profile locus after reaching a peak pressure. This associated knock transient intensity I 409 is a differential pressure measured from its base on the signal near the peak indicative pressure 413 to the transient pressure value peak. As shown in the test iterations of 30° BTC 405 and 32° BTC 407, the difference between incremental detonation time by even two degrees can result in significant-knock intensity increase and thereby damage the engine. Thus, in an aspect of the invention the ignition mode tests can be conducted with metered fuel quantities to obtain meaningful normalized measurable results. Detonation signal test results are stored for following analysis and comparison, allowing a determination of best spark ignition time for a given fuel in SI power mode. This is done systematically for a given fuel by stepping through the process shown above and storing resultant values with their associated cylinder component configuration states.

FIG. 4 shows the knock phenomena and its relationship to detonation time as a function of crankshaft angle. In a simple embodiment of the invention, SI tests are programmed to incrementally step through at ignition point increment tests 403 405 407, obtaining peak primary detonation pressures 420 418 413, knock intensities of 0 423 413 respectively. These test results are compared algorithmically to speed convergence on results, results of 403 with 405 and results of 405 with 407, comparing knock intensities I, then selecting the test which achieves the highest peak pressure 418 420 under allowable limits. Since the detonation signal at 28° BTC 403 does not display knock intensity, the knock intensity value defaults to zero. However, little or no knock characteristics from a test do not necessarily indicate a "best" or optimum result because of the allowable limits or acceptable pressure requirements, which must be factored in as well.

As shown in FIG. 4, the detonation signal peak pressure and knock peak are separate and distinct points, happening at different crank angles after top center. The signal can be processed in analog or digital form for identifiable parameters in the test cycle. Digital Signal Processing (DSP) technology known to those skilled in the art are sufficient to in speed and sophistication, to extract maximums on input signals and to find sharp peaks numerically by digital or analog techniques. Sample frequency and scan rates for pressure transducers of over 10,000 samples per second or kilo-hertz range are currently available, providing sufficient capability for processing detonation signals.

In more complex embodiments, the pressure intensities together with their associated knock periods 411 and frequency content yield results that can be compared using a signal frequency decomposition and numerical DSP processing techniques. Frequency decomposition techniques, known by those skilled in the art, provide the individual cylinder natural frequencies, identifiable parameters, of the cylinder components at which the energy deposition from the detonation frequency content can and would occur upon resonance. Thus detonation signal frequency content parameters are compared with the cylinder and components natural frequencies parameters to establish the damage based on detonation frequency content in resonance with the cylinder natural frequencies. In another embodiment, frequency content of associated knock transient signals are use to formulate figure of merit parameters using harmonic oscillator techniques factoring in natural frequencies of the cylinder for energy deposition damage from resonance correlation of knock transient with cylinder component natural frequencies. These are processed to determine the most damaging modes and consequently component settings giving rise to these damaging power cycles.

Control logic proceeds by determining the detonation acceptable combustion test by comparing knock intensity and frequency content resultant parameters, and selecting the test with resultant highest power representative value not in excess of allowable settable limits and with acceptable resonance correlation between detonation frequency content and cylinder component natural frequencies. The techniques of signal processing and numerical analysis of forcing functions in resonance with mechanical structure natural frequencies as discussed here are known to those skilled in the art and go well beyond calculating simple arithmetic ratios. Discrete digital transform or continuous analog processing and techniques can be used to perform other waveform analysis on the detonation signal as well as its affects on the cylinder or engine components, by extracting signal identified parameters and finding high pressure non-interacting frequency content as well as low pressures with component interacting frequency content.

In another embodiment frequency content of the test signals can be compared. Those with highest frequency and high pressure intensity, chosen above those with test results which have the highest pressure intensities above a set knock threshold pressure which depends on engine design or cylinder material fatigue limits. Empirical data shows that detonation signals with larger transients have more frequency content and limitations can be applied on those basis. Acceptable cylinder allowable limits are engine, cylinder design, material even manufacture specific. Therefore allowable limits are changeable and programmably alterable appropriate for conditions fuels and engine designs.

In yet another embodiment, high speed anolog circuitry is used to process detonation signals employing mathematical techniques of integration, convolution, differnetiation, filturing, application of transfer functions and general numerical mathematical manipulations. Integrating the detonation signal provides results proportional to the combustion work done on the piston. The integral of the pressure during power stroke duration is and identifiable parameter representative of the work done on the piston. Moreover, the pressure profile may be flatter and less peaked yet provide more piston work over the entire power stroke duration than a higher peaked pressure profile which rises and falls faster over the stroke duration. Thus, some power output parameters may otherwise be in error in some test instances if strictly peak pressure parameter comparision was used. An integration of the detonation signal over the power stroke duration in real-time provides a timely representative estimate of piston work done by combustion in a particular test. These results are used for comparison with other test detonation signals in determining the test yielding highest cylinder power. In yet another embodiment, accompanying knock data, is added to establish best mode and is therefore used in conjunction with other parameters. As with other embodiments, each test component settings and parameters are referenced and stored and are retrievable records that are used to re-configure the engine components where a particular test yields the best combustion results. In another embodiment, mathematical differentiation operation on combustion signal provides identifiable parameters for characteristic rate of burn. These are used in conjunction with chemical and engineering models to regulate fuel amounts and ignition timing, with computational algorithm more quickly converging on best mode of fuel combustion by adjusting test increments of component input state parameters in test logic.

Figure 5:
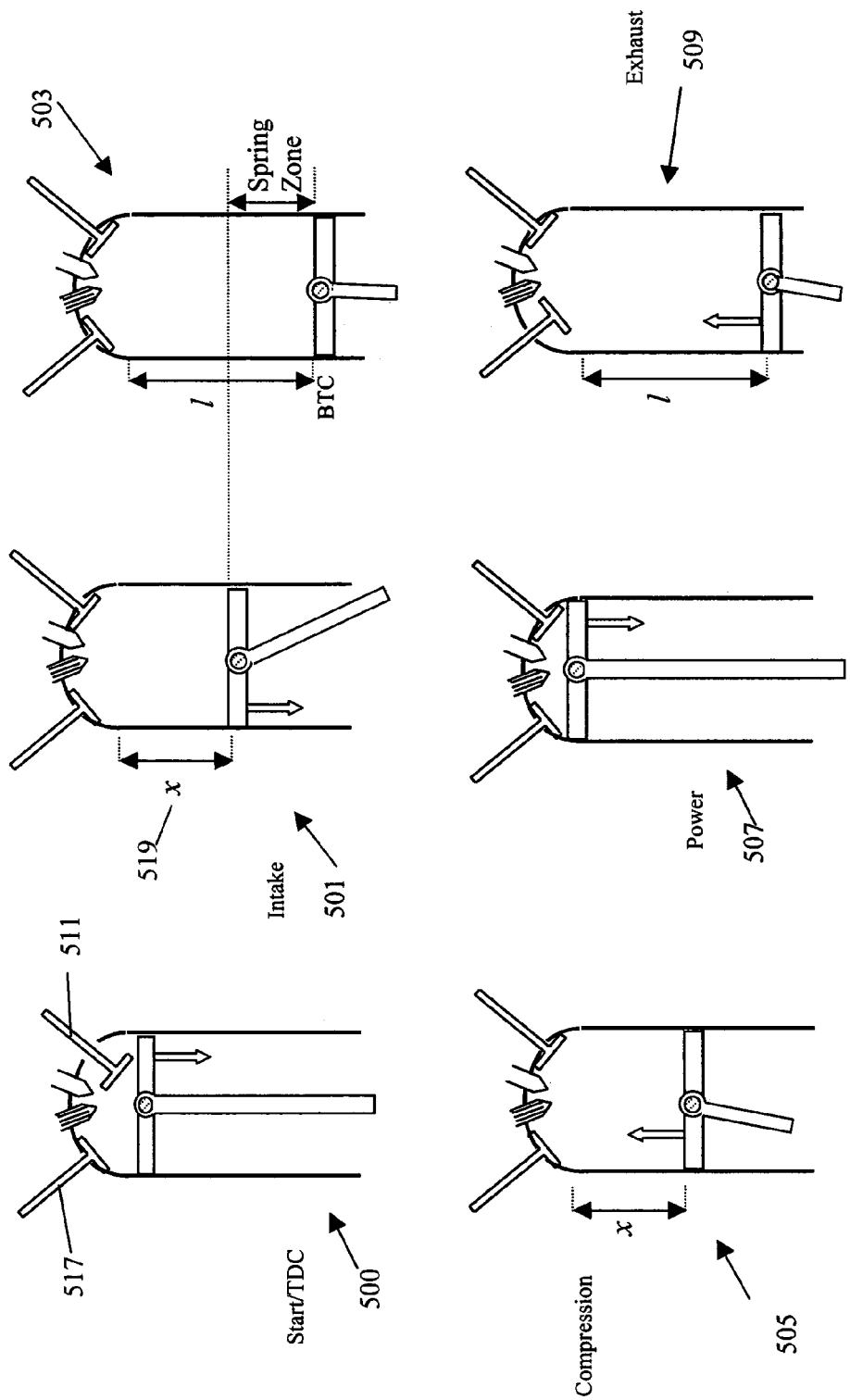
FIG. 5 illustrates an AVFIC engine spark ignition SI mode stroke sequence according to an embodiment of the present invention.

FIG. 5 is a schematic diagram illustrating the AVFIC engine SI ignition mode stroke sequence according to an embodiment of the present invention. An SI test mode can be comprised of a stroke sequence designed to produce the compression ratio of typical SI gas engines. The compression ratio of an internal combustion engine is generally defined as the ratio of the volume in a cylinder above a piston when the piston is at bottom-dead-center (BDC) to the volume in the cylinder above the piston when the piston is at top-dead-center (TDC). This definition holds loosely because the intake valve is opened generally collects the full volume of air through out the intake stroke and is closed generally thereafter, making the defined volumes the volume of air compressed. Thus compression ratio can just as well be defined as the ratio of volume open to draw in ambient air during the intake valve open state compressed to the volume above the piston when the piston is at TDC, the admitted air volume would be the volume of air to be compressed. Typical engines applying SI for a gasoline fuel typically have compression ratios in the neighborhood of 10:1.

Following this thread of reasoning to produce a compression ratio of typically 10:1, in an embodiment of the invention shown in FIG. 5 the air drawn into the cylinder 500 until the intake valve 511 remains open and the exhaust valve 517 is closed. The intake valve 511 is the same for all the strokes shown and is the valve on the right hand side of the cylinder. The exhaust valve 517 is the valve on the left hand side of the stroke shown. The intake valve 511 component is electronically controlled to remain open for the programmed duration while the piston travels a length X 519 on the intake stroke 501 after which time the intake valve is closed. The volume of air retained during the intake valve 511 open state will be compressed to yield the precise compression ratio programmed for a particular SI test. The piston continues to travel towards bottom dead center with the intake valve 511 in closed state to complete the intake stroke without additional air drawn 503. Typically, closing the intake valve at BDC of intake stroke will allow a known volume of air in the cylinder to provide the largest compression ratio; the volume swept out by the piston during air intake plus the volume above the piston at TDC divided by the volume above the piston at TDC. To obtain a compression ratio other than the engine fixed design maximum, the intake valve is closed at the length X 519 before the piston reached BDC 503. In other embodiments, the intake valve would open at other than TDC and be closed at some point calculated to achieve the selected pressure ratio by the piston sweeping out the desired cylinder volume. It is the duration of the intake open state responsive to the piston travel that determines the filled volume and hence the compressible air within the compressible volume. The computer controlled electronic valves permit the timing and duration of valve states to be precisely controlled and depend on engine parameters and control logic, not by fixed timing camshafts or other mechanical contrivances.

Upon reaching BDC 503 the piston begins compressing the drawn air 505 until it reached the point of intake valve closure on intake stroke 519 after which it will compress the air or air fuel mixture until piston reaches TDC for a subsequent power stroke 507. Spark ignition can occur BTC of the subsequent power stroke depending on the set mixture ignition timing. The power stroke will continue for the full length of the stroke upon which the exhaust stroke 509 will complete the cycle stoke sequence. By maintaining the power stroke length to the entire cylinder stroke length, the power stoke length can exceed the effective intake stroke length and can therefor use the effective pressure from combustion during each power stroke for a longer period than a comparable SI cylinder configuration could, intake and power strokes of equal length, and thus wring out more power on every power stroke than a comparable compression 4-stroke SI engine design. The exhaust stroke begins substantially near BDC on the exhaust stroke 509 whereupon the exhaust valve is opened to exhaust the combusted fuel.

Figure 6:
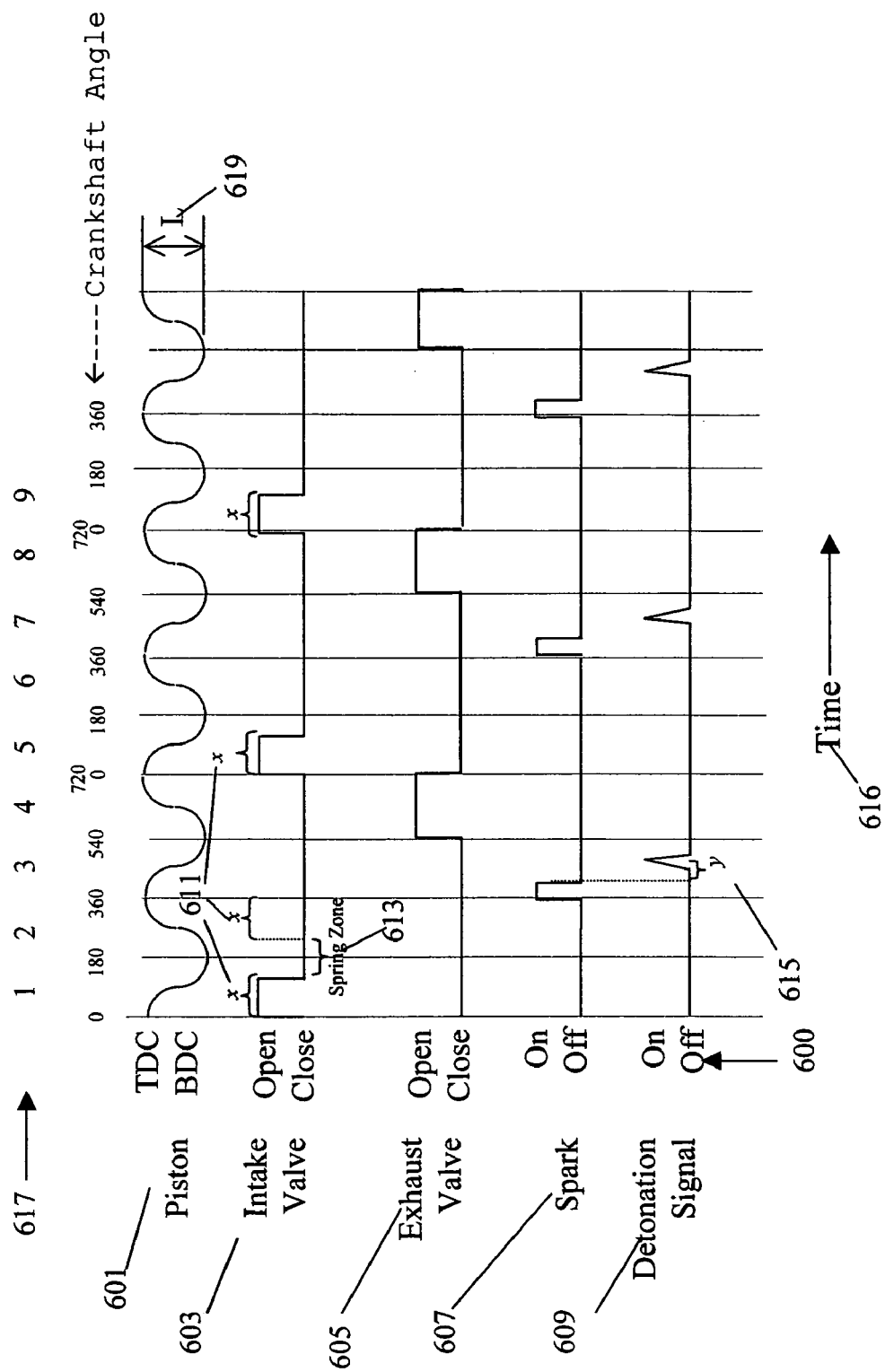
FIG. 6 is a timing diagram illustrating cylinder unit component states as functions of time in SI mode according to an embodiment of the present invention.

FIG. 6 is a timing diagram illustrating cylinder unit component states as functions of time in SI test mode according to an embodiment of the present invention. FIG. 6 shows the state positions 600 and duty cycles corresponding to a CPCPU piston position 601 stroke sequence 616 as functions of crankshaft angle, intake valve 603, exhaust valve 605, spark 607, and approximate expected detonation signal 609 as functions of time 616 during the SI power cycle in accordance with an embodiment of the invention. In this embodiment, fuel is injected at Intake Valve 603 open time. Because fuels characteristically allowing combustion at compression ratios of between approximately 8:1 and 10.5:1 are candidates for SI mode, fuel injection can be done at intake valve open duration or before initiation of power stroke.

In this SI embodiment, starting at piston 601 on intake stroke 617-1, the piston 601 travels from Top Dead Center (TDC) to it's fully retracted stoke length L 619 to Bottom Dead Center (BDC). The intake valve 603 however, is only open during this stroke for a period X 611 after which the piston continues to complete the stroke to BDC expanding the volume with rarefied mixture from the time that the intake valve 603 is closed. During this intake stroke the exhaust valve 603 is closed and the spark 607 is off. Not shown is fuel injection, which would occur during intake valve open on intake stroke or before spark initiation. Since the compression ratio for SI mode is a function of intake valve open duration on intake stroke, duty cycle defined and executed with programmed logic, fuel injection time and quantity are electronically controlled by a discrete or continuous functions which depend on engine speed, cylinder pressure and injector designed driving pressure, and known to one skilled in the art.

The second stroke 617-2 in SI mode, is the compression stroke. On compression stroke 617-2 the intake valve 603 stays closed for the full stroke duration although compression above ambient air pressure does not begin until the piston 601 reaches the position of intake valve 603 closure on intake stoke, this time from the opposite piston motion direction. The volume from the point of intake valve closure to BDC is called the "spring zone" 613 as the cylinder volume mixture it is rarefied and then compressed back to ambient pressure having a small spring effect on the piston 601 work before the piston continues to do any appreciable work compressing the drawn air during the remainder of the compression stroke period X 611 reaching its maximum pressure at piston 601 TDC.

The third stroke 617-3 is the power stroke. While all the cylinder valves 603 605 are closed, spark 607 ignites the compressed air-fuel mixture and the increasing pressure of the gases of combustion force the piston 601 to expand the cylinder volume and in doing so imparting rotational energy to the crankshaft producing engine power. The power stroke pushes the piston 601 the full length 619 of the stroke, exceeding the stroke length of effective compression for all compression ratio strokes except maximum design compression ratio which is achieved at intake valve open for the full stroke 619 duration. It is during the power stroke that a detonation signal 609 would be received and processed. It is expected that there would be a period Y 615 for pressure increase from the spark initiated combustion to the peak pressure of expansion. There would likewise be a latency period between the signal actual time and the signal reception and processing time, not shown here.

The fourth stroke 601 540–620 is the exhaust stroke. The exhaust valve 605 is opened while the intake valve 603 remains closed and the piston 601 pushes the spent gas past the exhaust valve 605 port clearing the cylinder and completing the cycle. Although the cycle appears to have 4 strokes, the intake and compression strokes are fractionated to accomplish the function of cylinder variable compression by programmable means on demand in real-time.

In spark ignition (SI) engines, the primary control mechanism for mixture ignition is through a spark at a preset time before TDC adjusted to minimize engine knock and maximize engine power. A short time after spark and during the power stroke, a detonation signal 615 is anticipated from sensor. Reception of signal or non-signal is processed, accounting for electronic and processing latencies, to determine if there was ignition and if so, whether optimum ignition parameters were found. The spark ignition timing is advanced or retarded by various algorithms executed by the control system to account for factors such as engine load, fuel octane level, programmed compression ratio and speed of test convergence.

SI Test Suite Implementation

Figure 7:
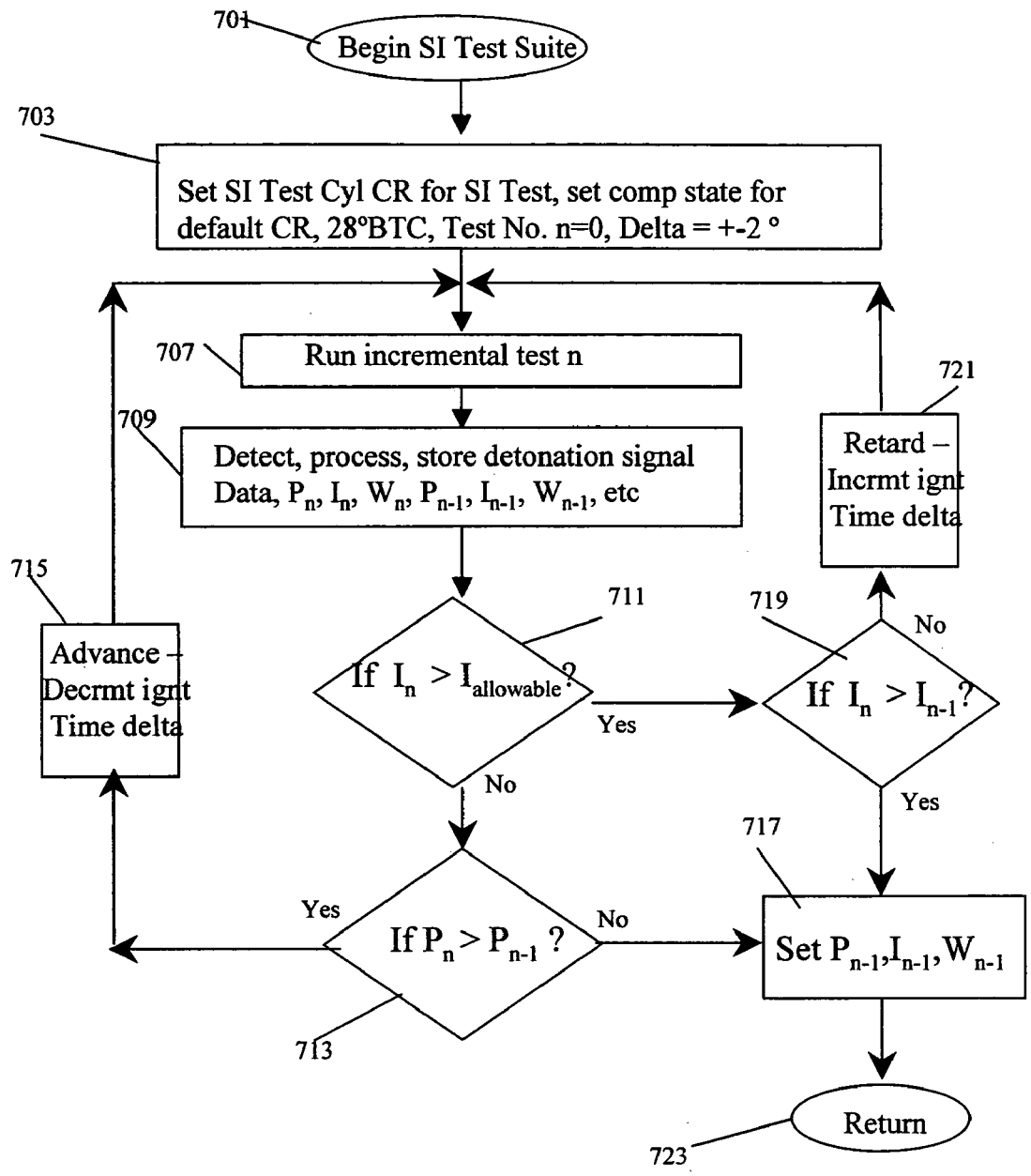
FIG. 7 is a flow chart illustrating SI test suite algorithm implementation according to an embodiment of the present invention.

FIG. 7 is a flow chart illustrating SI test suite algorithm implementation according to an embodiment of the present invention.

The algorithm implementation directs the execution of a series of combustion tests or events, processing the detonation signals from the events, and then systematically searching for the combustion event displaying the best effective pressure before onset of knock phenomena. In describing an embodiment test suite algorithm, stepping through the FIG. 4 sequence, the description traverses the series of tests beginning at 28° BTC 403 and progressing to 32° BTC 407 with references made in steps described in the FIG. 7 test suite algorithm. The algorithm objective is to find the test with the fuel detonation event that contains highest acceptable knock characteristic results associated with the highest effective cylinder pressure developed for power.

The test algorithm is implemented in steps staring at Begin SI Test Suite 701, where the program logic configures a selected CPCPU with the component states in accordance with an SI duty cycle and component configuration with initial default parameters, including such things as starting the duty cycle at intake stroke with piston position at TC, setting initial cylinder unit component states for a starting compression ratio of 10.5:1, setting spark ignition timing to occur at 28° BTC, subsequent ignition test at 2° increments, and other initial parameters are defaulted in Set SI Test 703. At the appropriate piston position, the test will be executed, Run incremental test n 707, tracking the sequential test number n and associated results obtained from test n combustion event. Detonation signal data, $P_n$, $I_n$, $W_n$, $P_n-1$, $I_n-1$, $W_n-1$, is sensed, processed, and parameters stored 709 upon combustion of the test sample of the given fuel as per the SI stroke sequence shown if FIG. 6. The n–1 subscript denotes an immediately previous test result. In the test series shown in FIG. 4, the test n peak detonation pressure 418 result $P_n$ shown in test locus 405 is subsequent to test n–1 locus shown 403 peak detonation pressure 420 result $P_n-1$. The highest intensity from the knock intensity transient 423 of the test n is labeled $I_n$, not zero if knock is found. This is compared with the previous test n–1 highest knock intensity, zero in test n–1 as shown in test locus 403. The algorithm logic next checks if knock intensity, $I_n$, is above the allowable or tolerable set limit 711. If the detected knock intensity In is above the allowed limit, $I_n > I_{allowable}$, then the knock intensity is compared to the previous test result knock intensity step 719, $I_n > I_n-1$, to determine if the knock transient phenomena is increasing or decreasing. If the knock intensity is decreasing, $I_n > I_n-1$, then the previous test n–1 parameters are better than the current test n parameters and results $P_n-1$, $I_n-1$ are stored or set 717 as best for this mode and logic execution is returned 723 to the calling program. If the knock intensity is increasing 719 based on the previous test n–1 result, $I_n > I_n-1$, then the ignition timing is retarded by incrementing spark timing parameter 721 the decrement measure amount of 2° followed by the next, n+1, incremental test run 707.

If the detected knock intensity is below the knock intensity allowable limit 711, $I_{allowable}$, then the logic threads to determine if the maximum detonation pressure for this test, $P_n$, is larger then the maximum detonation pressure of the previous test, $P_n-1$ 713. If the maximum detonation pressure is increasing from the previous test, then the ignition timing is advanced by decrementing spark timing parameter the decrement measure amount of 2° followed by the next incremental test run 707. If the maximum detonation pressure is decreasing from the previous test then the previous test results are better and the previous test parameters and results $P_n-1$, $I_n-1$ are set 717 as best for this mode and the logic thread returns 723.

The above algorithm implementation is a simple and only one of many possible algorithms to converge on the test parameters that yield the detonation results for highest effective pressure before the onset of knock phenomena. For the monotonically increasing and decreasing detonation curve without knock transients 403, this would be a first order approximation for the best effective pressure before onset of knock. Other embodiments use algorithms with more sophisticated feedback and prediction schemes that are more accurate, such as where power is represented by integration to obtain area under the pressure locus, or heuristics through use of stored empirical data for faster convergence to the optimum parameters for engine operation mode for a particular fuel.

Although this suite was shown using the SI combustion mode, it is analogously applied where possible in the CI and HCCI modes, with a change of primary control parameter analogously from incrementally advancing-retarding the spark time for SI mode to incrementally advancing-retarding the injection time for CI mode and incrementally increasing-decreasing the compression ratio for the HCCI mode tests suites.

SI Test Mode Implementation

Figure 8:
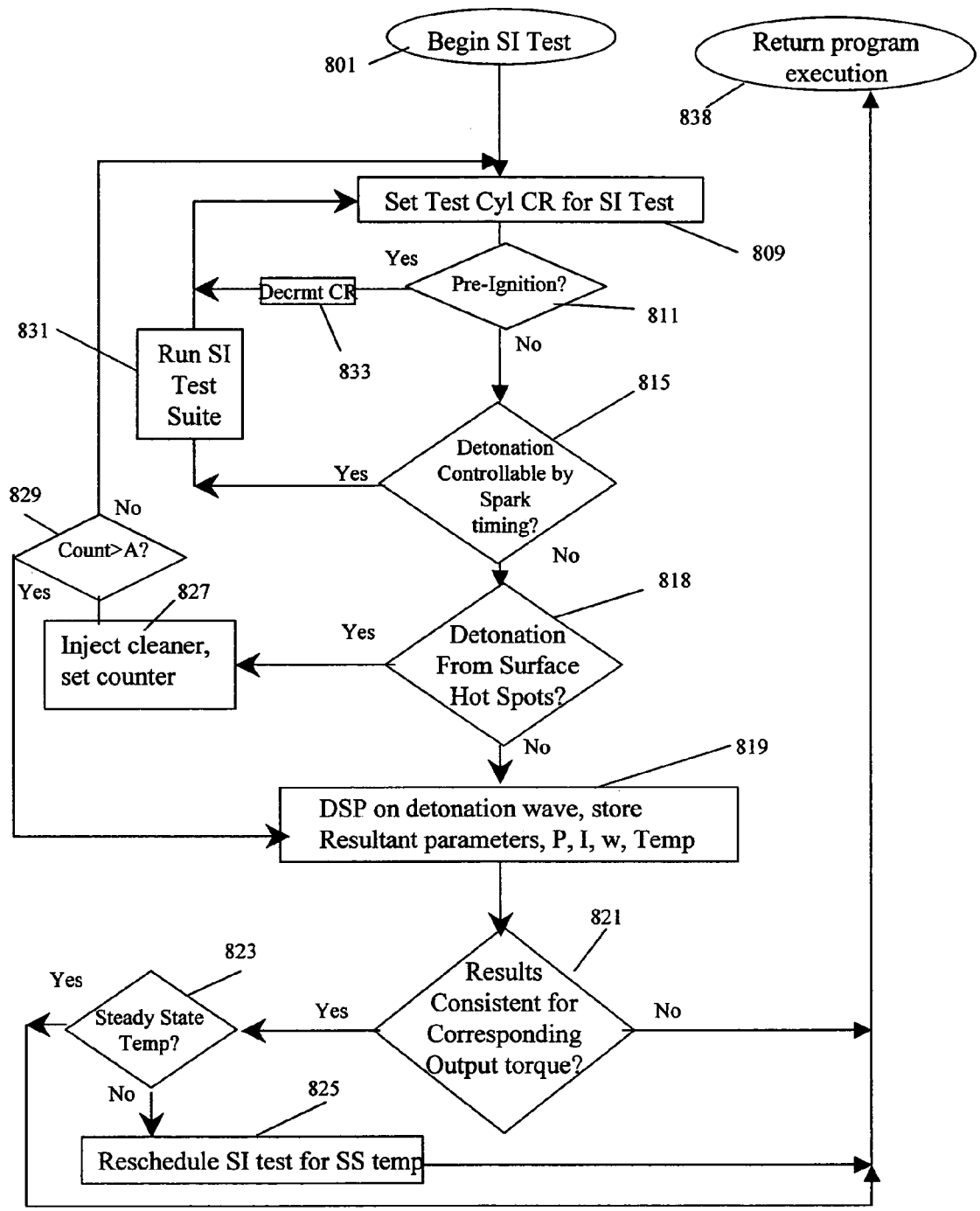
FIG. 8 is a flow chart illustrating high level SI mode test implementation according to an embodiment of the present invention.

FIG. 8 is a flow chart illustrating high level SI test mode algorithm according to an embodiment of the present invention.

The algorithm logic execution starts at Begin SI test 801. For SI test mode, the cylinder selected for the tests will be configured with SI cylinder unit component states; intake valve, exhaust valve, fuel amount injected at intake valve open duration, all for duty cycle associated piston positions, are configured as shown in FIG. 6 for the default compression ratio typical for octane fuel SI engines. Since the test primary control parameters, spark time for SI, fuel injection time for CI and compression ratio for HCCI, are known for particular and most used fuels, the combustion tests would use known fuel combustion data in estimating timing and selecting initial test parameter settings.

Default spark timing is set to provide the test starting point for the quickest test convergence on best fuel combustion state. Each test consists of an SI power cycle starting with an intake stroke, and ending with a combustion exhaust release. If there is charge pre-ignition 811, ignition occurred before programmed spark time, the compression ratio is decremented 833 and another set of cylinder unit parameters configured 809 and run. If ignition occurred after spark initiation, then what needs to be determined is if spark initiation 815 caused the ignition or whether an auto ignition from cylinder unit surface hot spots causes a primary combustion or secondary combustion fronts. Well behaved spark initiated mixture detonation have measurable characteristics and are somewhat engine dependant and ascertainable empirically. Assuming the spark-initiated ignition is designed to characteristically peak between 15° and 25° after TC, the difference between time of spark initiation and the detonation signal peak pressure reception, accounting for processing latencies and engine speed, is calculable and location relative to window ascertainable. Detonation peak signals calculated inside this 15°–25° after TC window would indicate that detonation is controllable by spark at the current compression ratio, and the SI test suite 831 can be executed to find best SI test. Detonation peak signals calculated outside this window would indicate and auto pre-ignition or post-ignition not controllable by spark for that state point. If detonation occurs before the window, pre-ignition, there is more than sufficient heat and or pressure for a programmed ignition and the compression ratio can be decremented 833 and a re-test 809 taken. If the detonation occurs after the window, post-ignition or with multiple wave fronts indicative of multiple hot spot ignition sources, are detected then detonation occurs potentially from a surface hot spots 818 and the cleaner injection 827 will be warranted or other surface residue procedure done. This corresponds roughly to the experts in the field who listen for audible engine low pitch tone to signal pre-ignition. Spark plugs may also be fouled in which case a cleaner solution will serve a double purpose. If hot spot auto-ignition continues beyond the set counter number of tests, the compression ratio can be decremented. Thus this unintended ignition signal would indicate what is needed. So that there are no endless loops, a counter for injection cleaner 829 could be implemented to eventually discount the surface hot spot factor and defer to better results from other modes, by storing the best test results and associated parameter state cycles 819 and branching to return to the main flow of execution. In another embodiment checks are made for best component state settings obtained from the best test results and used for a preset number of power cycles to compare with resulting output torque 821. Unacceptably low value results due to set parameter criteria, power or output torque branches logic execution to return 838 control to calling program while acceptable corresponding power or output torque results would branch to an engine temperature check 823. If the engine is still cold, the SI tests can be rescheduled 825 to run again before returning 838 execution control. A steady state engine temperature 823 would not reschedule before return 838 of execution control since the steady state temperatures would be presumed.

HCCI Mode

Figure 9:
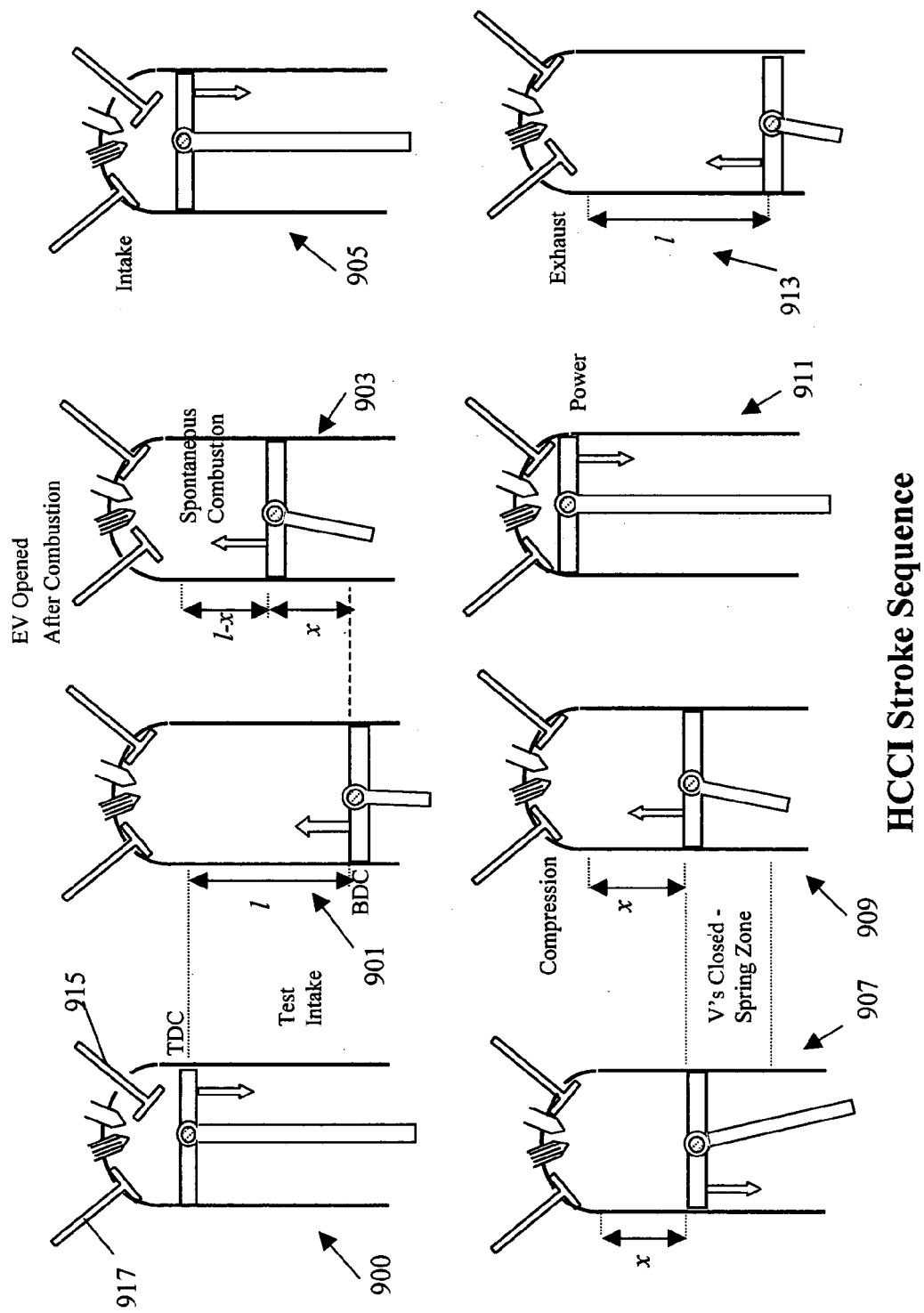
FIG. 9 is a schematic diagram illustrating the HCCI mode stroke sequence according to an embodiment of the present invention.

FIG. 9 is a schematic diagram illustrating the HCCI mode stroke sequence according to an embodiment of the present invention. An HCCI mode is comprised of a stroke sequence designed to first identify the compression ratio which will spontaneously combust the given fuel sample, then proceed in power cycle, accomodating the strokes to the spontaneous combustion character of the mixture. The compression ratio of an internal combustion engine is defined as the ratio of the volume in a cylinder above a piston when the piston is at bottom-dead-center (BDC) to the volume in the cylinder above the piston when the piston is at top-dead-center (TDC). The compression ratio can equivalently be defined as the ratio of volume open to draw in air during the intake valve open state which is then compressed to the volume above the piston when the piston is at TDC. Thus the compression ratio is a function of intake valve open period on intake stroke with all other cylinder orifaces being closed.

In order to produce a compression ratio necessary for combustion, a known quantity of fuel is injected into the cylinder with air drawn into the cylinder 900 with intake valve open for the full intake stroke. At BDC, the intake and exhaust valves are closed and the volume of air-fuel mixture is compressed 901 to spontaneously combust. This occurs at a piston displacement of X from BDC, typically less than the full stroke displacement L reached at TDC because the cylinder is designed for a higher compression ratio necessary to accommodate a variability of fuel combustion characteristics. Upon combustion at piston displacement X from BDC 903, the exhaust valve is opened to exhaust combustion products and reduce piston backpressure as the piston continues to travel towards TDC to complete the stroke. At combustion 903, the piston position L-X from TC, a detonation signal is dispatched, giving the time at which the detonation signal is received minus the processing latencies, which are quantifiable and accounted for, allowing calculation and determination of the fuel mixture spontaneous compression distance X from BDC 903 to be made. Thus, in a following intake stroke 905, the intake valve is open and fuel is injected but intake valve is open for only the piston travel length X 907, after which the intake valve is closed for the intake stroke duration to BDC, generating a temporary negative pressure called a spring zone analogous to the SI intake stroke spring zone. The following compression stroke 909 reduces the vacuum until the piston travels a distance L-X, at which point mixture compression begins and builds to the ignition point state that is achieved approximately at the TDC of the compression stroke. The following power stroke 911 is typical with inlet and outlet valves closed while the piston is driven to BDC of the full stroke. By maintaining the power stroke length to the entire available piston travel length, which is greater than the effective intake stroke for drawing in air, the cylinder can use the effective pressure from combustion during each power stroke which extends to it's maximum compression ratio stroke length and longer than its effective intake stroke length with the exception of operation at the cylinder's highest compression ratio. Thus the power stroke retains the stroke efficiency of a comparable size compression ignition diesel engine without sacrificing compression ratio variability. The exhaust stroke begins substantially near BDC 913 whereupon the exhaust valve is opened the exhaust gas expelled.

In another embodiment, the intake valve on intake stroke or exhaust valve on beginning of compression stroke, would be open and then closed at some point calculated to achieve the selected pressure ratio based on piston position calculated to achieve the desired CR. The duration of the intake open state responsive to the piston travel determines the filled volume and hence the amount of air within the compressible volume. The computer controlled valves allow for the timing and duration of valve states to be precisely controlled and depend on engine parameters and control logic, without mechanical constraints from camshafts or mechanical variants. In yet another embodiment, Spark ignition can be used in conjunction with HCCI for a stronger mixture ignition.

Figure 10:
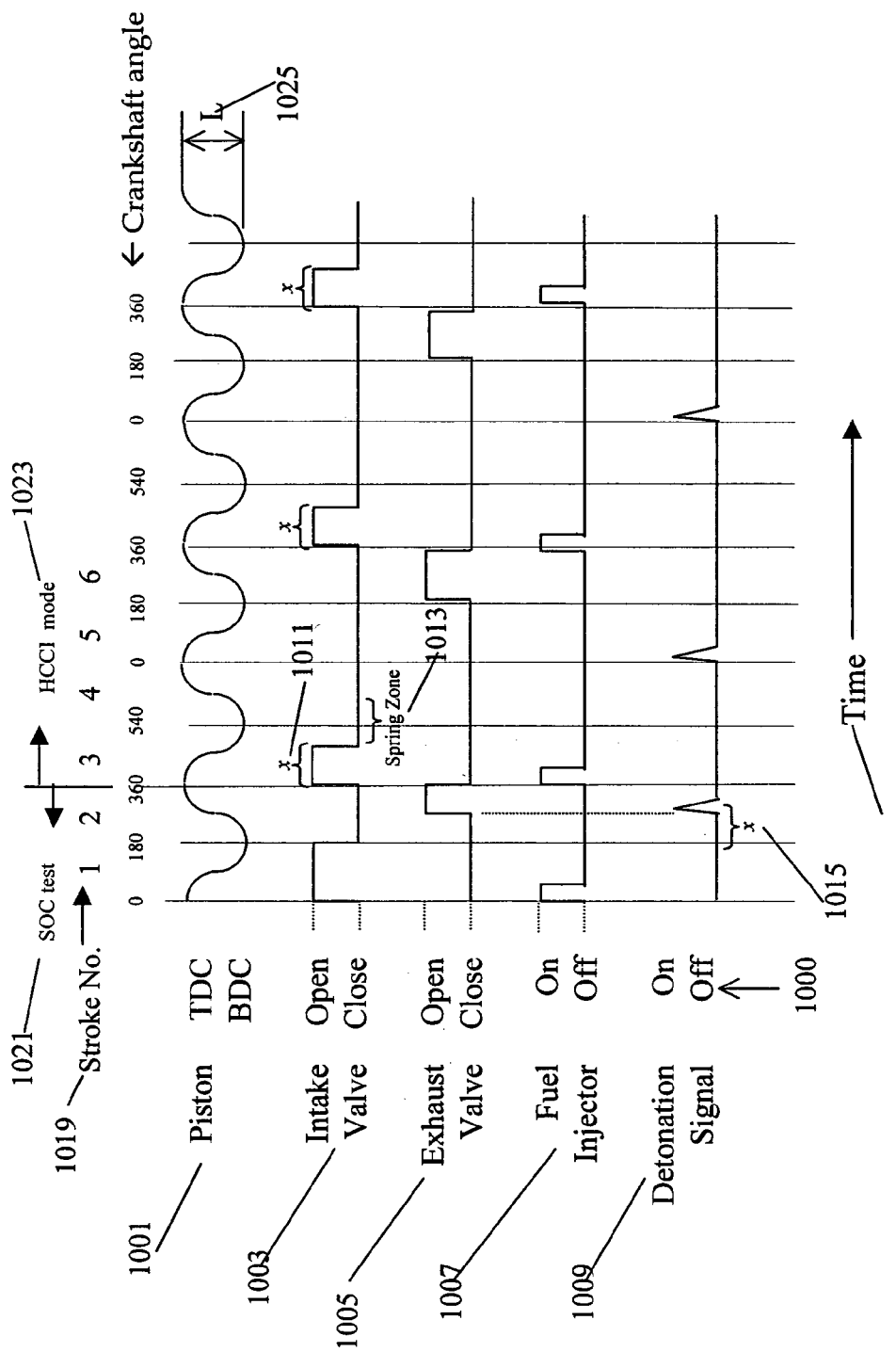
FIG. 10 is a timing diagram illustrating cylinder unit component states as functions of time in HCCI mode according to an embodiment of the present invention.

FIG. 10 is a timing diagram illustrating cylinder unit component states as functions of time in HCCI mode according to an embodiment of the present invention. FIG. 10 shows the CPCPU component state positions 1000 for duty cycles defining a piston TDC 1001 with a TDC to BDC stroke length of L 1025, intake valve 1003, exhaust valve 1005, fuel injector 1007, and detonation sensor signal 1009 as functions of time 1017 during combustion characteristic test mode and associated power mode in accordance with an embodiment of the invention.

In HCCI test mode, the control logic receives a signal 1015 of the spontaneous combustion event from heating and compression of the mixture on second stroke 1019-2. The control logic also receives data for crank angle position and hence related piston position. In a simple embodiment, the first two piston strokes are used to establish an approximate starting compression ratio. The compression ratio necessary to ignite a spontaneous combustion for the given fuel is established from the piston position at spontaneous combustion during the second stroke 1019-2, derived from detonation time minus the preceding BDC time, X 1015. Once X 1015 time is known, on subsequent intake strokes the intake valve open time is set for the piston travel distance corresponding to X 1015 time from TC, which is a function of engine speed or time X 1015 and or corresponding piston position. Thus the engine control system re-configures the CPCPU components in accordance with the HCCI duty cycle with the intake valve open duration of X 1011 starting with the third stroke 1019-3 as an intake stroke for an HCCI power cycle. A cylinder design accomodating a range of compression ratio between 21:1 and 8:1 could typically handle the fuel combustability range of most current fuels and their blends, consequently an embodiment of the invention would have a cylinder designed to accommodate at least the dimensions for 21:1 compression ratio.

HCCI test mode portion begins on intake stroke 1019-1, the piston 1001 travels from Top Dead Center (TDC) to it's fully extended stoke length L 1025 at Bottom Dead Center (BDC). This first and the second stoke 1019-2 are used for determining the ignition pressure at Start OF Combustion (SOC) and are the test stroke sequence, intake and compression-exhaust, used to establish the minimum compression ratio (CR) at which the fuel mixture will spontaneously combust. The intake valve state 1003 is open during this stroke for the entire stroke period and a test quantity of fuel is injected 1007 for homogeneous air-fuel mixing in the cylinder during intake stroke. Concurrently, the exhaust valve state 1005 is closed.

The second 1019-2 HCCI stroke, in SOC test 1021, piston 1001 starting generally around a Crankshaft Angle (CA) 180 deg begins to compresses the mixture with the intake valve state 1003 closed for the full stroke duration and compression. During this compression stroke at some point before TDC the mixture will combust spontaneously as the compression heats the mixture until spontaneous combustion. Upon combustion, the detonation sensor 1009 will register the time of combustion and the piston position is known from the crankshaft position or engine speed. Accounting for all related system signal reception and processing latencies, the engine speed and actual detonation time minus the immediately preceding CA BDC time, will establish the stroke compression distance related to piston 1001 travel time X 1015, the intake valve 1003 open time related distance necessary to achieve spontaneous ignition. Upon detonation in this compression-exhaust stroke 1019-2, the exhaust valve 1005 is set open for venting exhaust to reduce cylinder backpressure. If system latencies for signal reception and processing are greater then the time between detonation signal 1009 and second stroke 1019-2 completion at TDC, then the cylinder components will be set in an ineffective position and set for an HCCI power mode 1023 starting the third stroke 1019-3 on the next cycle opportunity. Otherwise, the third stoke 1019-3 will be contiguous, an HCCI mode intake stroke with an established compression ratio translated to an intake valve open duration X 1011, established in SOC in second stroke 1021.

The third stroke 1019-3 shown is an intake stroke, and is the start of the HCCI power cycle. Since the combustibility character for necessary intake valve open duration has been established in the preceding stroke for the given fuel, the intake valve components are actuated to open the intake valve 1003 for the X duration 1011, drawing in air for the volume which when compressed will spontaneously ignite at TDC beginning the power stroke. Fuel is injected 1007 so that the mixture would attain homogeneity before ignition and provide uniform burn characteristic of HCCI during combustion. The exhaust valve 1005 remains closed for this entire stroke but the intake valve 1003 closes only after the X period 1011 elapses, providing the variable compressibility. The intake stroke continues to BDC creating a small negative pressure. This is the refraction half of the "spring zone" 1013.

The fourth stroke 1019-4 is the HCCI pure compression 1001 stroke. The exhaust valve 1005 and the intake valve 1003 are closed as the piston 1001 compresses the mixture to its determined compression ratio ignition state point. The beginning of this stroke compresses the rarefied air up to ambient, labeled "spring zone" 1013 and work done by the piston is recouped minus friction losses, and the piston continues from there to TDC, compressing the mixture to ignition.

The fifth stroke 1019-5 is the power stroke. The piston 1001 starts at TDC. The cylinder intake valve 1003 and exhaust valve 1005 are closed, the heat of compression spontaneously ignites the compressed air-fuel mixture and the pressure of the gases of combustion forces the piston 1001 to expand the cylinder volume and in doing so imparts rotational energy to the crankshaft. The power stroke pushes the piston 1001 the full length of the stroke, from TDC to BDC, equal to the stroke length of comparable size compression ignition diesel engines, retaining stroke efficiency even when burning alternate fuels.

The sixth stroke 1019-6 is the pure exhaust stroke. The exhaust valve 1005 is opened while all other cylinder valves 1003 remain closed and the piston 1001 pushes the spent gas past the exhaust valve 1005 port clearing the cylinder and completing the cycle that begins again at the third stroke 1019-3 unless directed otherwise.

Once a SOC test 1021 has be completed, the HCCI spontaneous ignition state for a particular fuel mixture is known and a first order approximate compression ratio is determined. The first two strokes of the HCCI sequence are then redundant and bypassed for the HCCI power mode 1023 and finer incremental HCCI tests using strokes three 1019-3 through stroke six 1019-6 typically involve smaller increments of intake valve open duration and other control parameters involved in finer control for optimal engine power. The primary control factor for HCCI, the CR, is incrementally altered in iterative tests to provide data that is used to determine the best operation parameters for the component states.

As in the SI mode, the cylinder volume from the point of intake valve closure to BDC on intake stroke is called the "spring zone" 1013 as first it is rarefied and then compressed back to ambient pressure having a nominal springing effect on the piston 1001 before the piston does any appreciable work compressing the drawn air during the period X 1011 to its maximum pressure at piston 1001 TDC. The disadvantage is more than made up on the power stroke, which can then deliver piston work for the entire length of the stroke while providing the flexibility of a variable compression ratio engine.

A detonation signal 1009 is received from sensor and processed by the computer control system. Accounting for electronic and processing latencies, DSP is used to determine identifiable parameters from the signal waveform.

HCCI Signal Waveform

Figure 11:
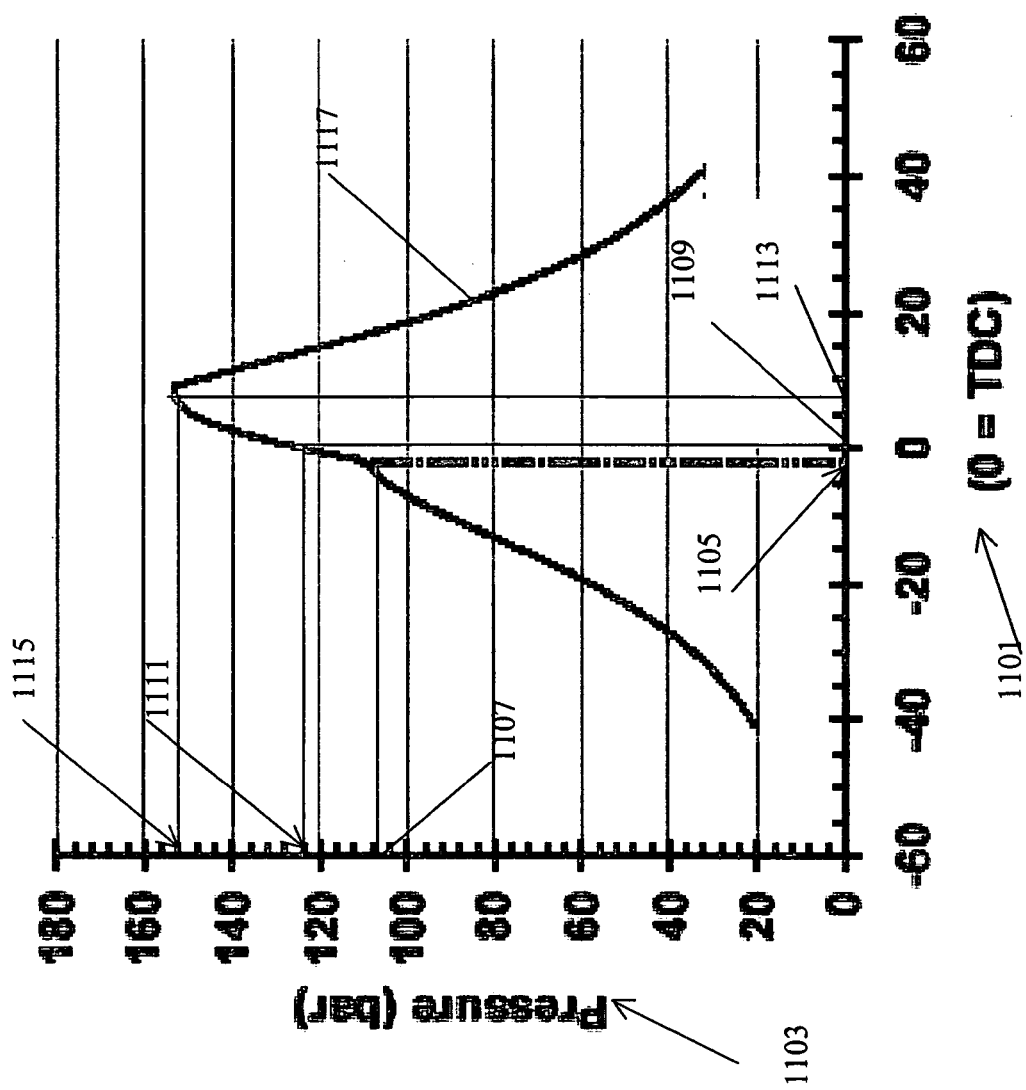
FIG. 11 is a graph illustrating a cylinder pressure time history for HCCI as function of crank angle relative to piston TDC in a HCCI mode showing combustion characteristics according to an embodiment of the invention.

FIG. 11 is a graph illustrating a cylinder pressure time history for HCCI as function of crank angle (CA) relative to piston TDC in a HCCI test model showing combustion characteristics according to an embodiment of the invention. The detonation waveform of cylinder pressure 1103 plotted as a function of cam angle relative to 0° at piston TDC 1101.

Programmed ignition controls the actual Start Of Combustion (SOC), and occurs when the air-fuel mixture has been compressed to sufficiently high pressures and temperatures that induce a fuel characteristic chemical exothermic threshold combustion reaction to occur. Mixture compression is the primary method used to control ignition in HCCI mode. Empirical HCCI data suggests that the thermal efficiency is relatively sensitive to combustion phasing. However, near optimum results are obtained where SOC for HCCI occurs near or at TDC of the power stroke. Thus where the control of combustion initiation is successful in maintaining the SOC at near or before the TDC, and the peak pressure below allowable cylinder stress limits and minimum knock transients, HCCI is a viable mode of engine power operation mode. Thus an aspect of the invention is to control HCCI combustion within the useful range of control parameters. However, since the peak pressure optimally occurs after piston TDC but ignition must occur before TDC and the delay is unique for each fuel or fuel blend, an aspect of the present invention includes an estimation component in an algorithm to maintain control of HCCI mode within optimal range of operation in real-time.

A typical HCCI pressure time history in FIG. 11 illustrates a baseline result that achieves SOC 1105 at 2° before TDC with corresponding pressure 1107. The pressure continues to rise at a steeper rate through TDC 1109 with corresponding pressure 1111 and to a peak pressure 1115 at CA 1113 8° after TDC. The SOC positions 1105 has major affect on the peak pressure 1115 magnitude and position 1113 and whose phasing must be carefully controlled to retain cycle efficiency since maximum pressure 1115 tends to rise as SOC 1105 time advances. Thus emperical data or predictive characteristic curves must be employed to position SOC and is part of the primary control algorithm. Published HCCI combustion data for some fuels are used emperically to derive the peak pressure CA location 1113 from SOC 1105 time, thus published data also allows peak pressure 1115 to be plotted as a function of SOC 1105 empirically and to illustrate a cycle of opertion for this embodiment. These empirical relationships are used in an aspect of the invention to back calculate the SOC 1105 from the received detonation signal time and peak pressure 1115, so that known latencies are included in the SOC to peak pressure time calculation to maintain the SOC within the target time window. Where published data is not available, extrapolations from known data when consistant and reasonable, can be used.

Rate of Heat Release (ROHR) from known burn rate profiles for some fuels have been measured and tabulated. These established data can be compared with test data detonation profiles received from HCCI tests to help determine which fuel is likely to be the given fuel, aiding in prediction of other combustion parameters and full fuel power amounts used in more complex embodiments. Differentiation of the pressure profile would give plots showing instantaneous ROHR, something that is used in more complex embodiments of the invention.

Also, HCCI detonation characteristics generally exhibit rapid combustion with high-pressure rise rates provoking audible noise and high peak pressures. These can be damaging as knock transients in SI and CI modes. The plot in FIG. 11 shows a smooth monotonically decreasing pressure indicating that there is no knock phenomenon with this combustion event. Therefore in some embodiments of HCCI mode, smaller fuel quantities could be used to initially determine the combustion state parameters and compression ratio and thereafter, larger metered fuel quantities for power mode. Furthermore, the combustion of highly dilute mixtures may result in relatively low power density unless supercharged.

HCCI Test Program Algorithm

Figure 12:
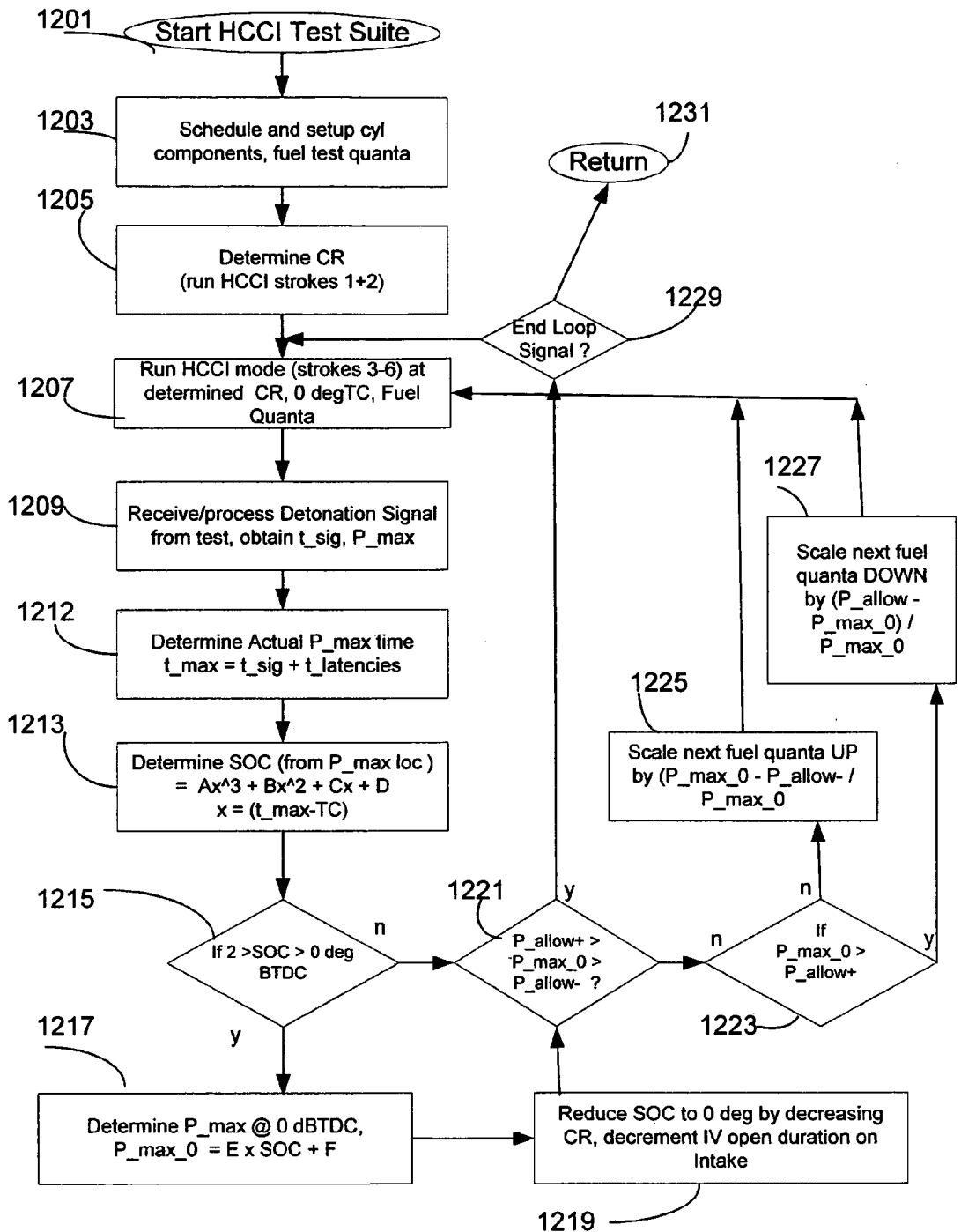
FIG. 12 is a high level flow chart illustrating HCCI test mode algorithm according to an embodiment of the present invention.

FIG. 12 is a high level flow chart illustrating HCCI test mode algorithm according to an embodiment of the present invention.

The primary control variable for ignition in HCCI mode is the compression ratio (CR) which acheives a pressure-temperature state at which the air-fuel mixture's chemical properties produce spontaneous combuston at a particular time during the compression stroke. The SOC is controlled by adjusting the compression ratio through intake valve open state duration such that cylinder state pressure and temperature are achieved within a window of time for SOC. This is the HCCI control objective for which implementation of the HCCI mode control logic begins at 1201. The cylinder temperature and pressure for SOC is determined as shown in discussion of FIG. 11 above and controlled by configuring cylinder component states for intake and exhaust valve state timing, intake valve open state duration on intake stroke or exhaust valve opens state duration on compression stroke, as shown in discussion on FIG. 10. FIG. 12 illustrates the steps of flow of step timing and emperical data implemented in positioning the required SOC in the time window allowing for an efficient HCCI power mode cycle.

The cylinder component states and stoke sequences as per HCCI test duty cycle including initial test fuel quanta are set and scheduled 1203. Fuel quanta can be smaller to establish spontaneous combustion point than required for power stroke since the spontaneous combustion state point is a chemical constant of the fuel and a function of state conditions. Component latency profiles are factored into program logic to anticipate the piston TDC time at start.

The sensor detonation signal received from detonation occurance during the second stroke in the SOC test provide sufficient information to determine CR 1205, as described above.

The HCCI mode duty cycle strokes are programmed in accordance with the HCCI duty cycles continue as strokes three through six with the CR determined from the first two strokes 1207. Thus the CR sets the intake valve open duration which results in a detonation of the fuel a predetermined margin before 0° TDC. Fuel quanta is increased from test mode to power generation amount, estimated by combustion energy projected for the cylinder size, emperically or closed form, to a conservative amount not to result in a pressure in exess of allowable limits and in the fuel increase estimation step 1225. This fuel quanta is ascertained to more precision in finer test iteration downstream if the HCCI mode is selected as the primary power mode.

Following the algorithm logic execution, the detonation signal is received and processed 1209 for peak pressure, time of peak pressure, transient pressure knocks and frequency content of the signal. This can be done with Digital Signal Processing (DSP) hardware, analog processing firmware, hybrid chips or numerical processing techniques known to those skilled in the art of signal processing. Associated variables from other sensors as well as known engine operation parameters such as engine speed, cylinder temperature and other parameters are likewise stored in association with the detonation signal results and are used in calculations or estimations of parameters necessary in the controlling the power mode determined best by comparison of results from the ignition test detonation signals as described above. The actual time of peak pressure 1212 is determined from subtracting the known sensor response and processing latency times from the tagged and processed signal time relative to immediately preceding BDC time markera. The actual signal time is subracted from the associated power stroke TDC of the detonated signal to determine the actual time location of maximum pressure relative to power stroke beginning at TDC. This is converted to CA degree or other useful units for use in deteriming the actual SOC time, using the associated stored engine speed and other data.

Emperical data for varous combustable fuels revealng of their combustability characteristics are available in the literature. In an embodiment of the invention, emperical data combustion characteristics are digitized into data structures and used in the programmable logic as illustrated below, in estimating the actual time of SOC 1213. In an application of a specific fuel identified combustion characteristic data, a third degree polynomial was derived from natural gas HCCI data for this illustration. In determining the SOC 1213 from peak pressure, P_pressure, occuring at t_peak time in cam angle degrees after TDC, a regression analysis of a digitized locus of data points provided the constants for a third degree polynomial for extrapolating SOC in CA degrees from t_peak:

$$SOC = Ax^3 + BX^2 + Cx + D$$

x=(t_peak in degrees after TDC and Pressure in Bar)
A=0.02
B=−0.52
C=2.55
D=4.49

For control in HCCI mode, SOC is maintained at a calculated time window before TDC by means setting cylinder component states to achieve spontaneous combustion in a specific CA window. In HCCI ignition mode, the SOC must occur before TDC 1215, thus SOC window would optimally be set for before TDC and extending to TDC and a feedback loop to maintain the SOC position to effectuate a shift back to that SOC window if there is an error or drift from the target SOC window. In an embodiment selecting the target window time of SOC as 2° before TDC, thread execution would have the logic check the determined SOC 1215 for its location within the target window;

If 2°>SOC>0 BTDC

If the determined SOC is outside the target window, a peak pressure would be calculated based on a pressure peak which would have occurred if the SOC cam angle was zero, or offset in its SOC window, and an incremental change in CR based on the calculated SOC deviation would be determined 1219 incrementing CR for correcting SOC back into the target SOC window, to be applied on the following test in seeking a detonation at SOC time within the controllable SOC window and for convergence of peak pressure below a set maximum allowable pressure criteria. The maximum allowable cylinder pressure is a known engine design parameter and a given data point used in the search algorithm in which comparisons are made in establishing non-damaging power cycles.

If the SOC occurs before the target SOC time window sought, the peak pressure of the SOC time received can be used numerically in providing extrapolated values for aiding in converging test sequences seeking peak pressures under allowable limit pressures. The pressure at zero CA for SOC can be determined 1217 from empirical data or estimation functions. A first-degree polynomial from a regression curve of the natural gas data used above would yield an estimate peak pressure at TDC, $P\_press_0$:

$$P\_press_0 = E \times SOC + F$$

SOC=x°BTDC, $P\_press_0$ is in bar
E=4.6
F=144.5

If the SOC is within target SOC window, the associated peak pressure is checked to determine if the peak pressure is within an acceptable pressure range 1221 between P_allowable+ and P_allowable− for the cylinder.

If the measured pressure is acceptable, the component settings and parameters are optimal and the logic will branch to determine if there is a need to end the loop 1229 and if so a return 1231 call is made. If no end loop signal is present, the logic will branch back to the HCCI duty cycle to continue to control the HCCI mode for refinement with a suite of tests using finer CR increments to determine if component settings can be improved for better performance against set criteria.

If the pressure is not within acceptable bounds, not between P_allowable+ and P_allowable _−, and the max pressure is above the allowable pressure 1223, then the fuel amount will be adjusted to scale up fuel quantity for 1225 the next test in the suit if the pressure can be increased for more power out without exceeding allowable limit, or scaled down 1227 if the pressure is above the allowable limit. The change in CR and Fuel quanta will be made for the next test 1207 which will branch to 1207 and continue in the loop in an attempt to converge to optimal power without exceeding allowable pressure.

Iterative tests are done on incrementally changed compression ratio firstly and fuel amounts secondly receiving HCCI detonation signals and analysing resulting signals for identifial parametes. Detonation signals containing peak pressures above allowable limits are scaled down first by adjusting the SOC nearer to 0° TDC and then scaling up or down on fuel quanta, to produce the highest allowable cylinder pressure.

Other HCCI Parameters Test Iteration Loop

In other embodiments, iterative testing by varying the compression ratio, combusting mixture and analysing resulting signals for the acceptable knock character at maximum power is analogous to the general method in SI mode. Acceptable knock parameters within a set of the highest power producing event as shown from parameter results extracted by mathematical integration of the detonation signals are or highest peak cylinder pressure from detonation signal are also candidate results for determining the highest piston work done by combustion and are stored for comparison with other test results for best combustion configuration.

Fuel injection time and duration of ambient or compressed air, temperature or moisture, quantity of fuel injected, injection spray mode and nozzle, fuel quanta are possible variables which can be incremented-decremented for finer primary control variable test iterations. Empirical data in memory storage and programmed logic can be implemented by the AVFICE computer control system to reduce the number of tests needed in the ignition mode set and refined test suite by use of predictive models which indicate non-convergence of results to an expected result.

Cylinder Unique HCCI Test Iteration Loop

By virtue of their design and layout, engines have non-uniform temperature distributions. Combustion state points are temperature and pressure dependant and different cylinder initial temperatures will affect different spontaneous combustion compression ratios for the different cylinders. This is a large problem for HCCI engines with camshafts, as those designs must compromise in very unsatisfactory ways usually sacrificing engine efficiency or engine life. Thus tests ascertaining best operating settings for one cylinder will not necessarily predict cylinder component settings for all cylinders without adjustments accounting for the important parametric temperature differences and further independent cylinder refinement tests. Independent control of cylinder unit compression ratios for those cylinder unique temperature ignition points could also be established in the refinement test suite and iterated for each cylinder after an ignition mode for the engine is established.

In an embodiment of the invention where the ignition mode tests establish HCCI ignition mode as best or preferable, a series of refinement tests would proceed for each cylinder unit to establish cylinder unique ignition points independently at the cylinder steady state power temperature. The refinement test suite objective would be to converge on acceptable range of knock and other parameters necessary in determining a cylinder unit's optimal component states and stroke timing.

In furtherance of this embodiment, a stored empirical engine temperature profile would be used. For example temperature profiles indicating that one cylinder unit temperature is 5° higher than that of a tested cylinder unit, then empirical or other estimation method can be used to project a compression ratio for the non-tested cylinder that will coincide with the projected increase in temperature differential. The projected compression ratio can be used to select component settings instead of uniformly incrementing to the next compression ratio for another cylinder unique refinement test. Thus another aspect of the invention is to use smart control methods and stored logic to reduce the number and amount of testing required ascertaining individual cylinder unit unique component settings for a given fuel.

Alternatively, measured temperatures from proximate cylinder temp sensors, known mechanisms and phenomena, including such engine unique characteristics as heat transfer mechanisms for various ignition modes, can be used to estimate and predict certain cylinder state temperatures, pressures and ignition state points useful for a better initial condition component settings or other parameter predictions. For example in HCCI mode, knowing from the engine temperature profile that one cylinder runs 5 degrees hotter than the test cylinder, combustion state models may predict that the CR which will achieve spontaneous combustion in the target window, may be set at 0.5 lower than the test cylinder to achieve similar combustion results in the SOC target window.

CI Test Mode

Figure 13:
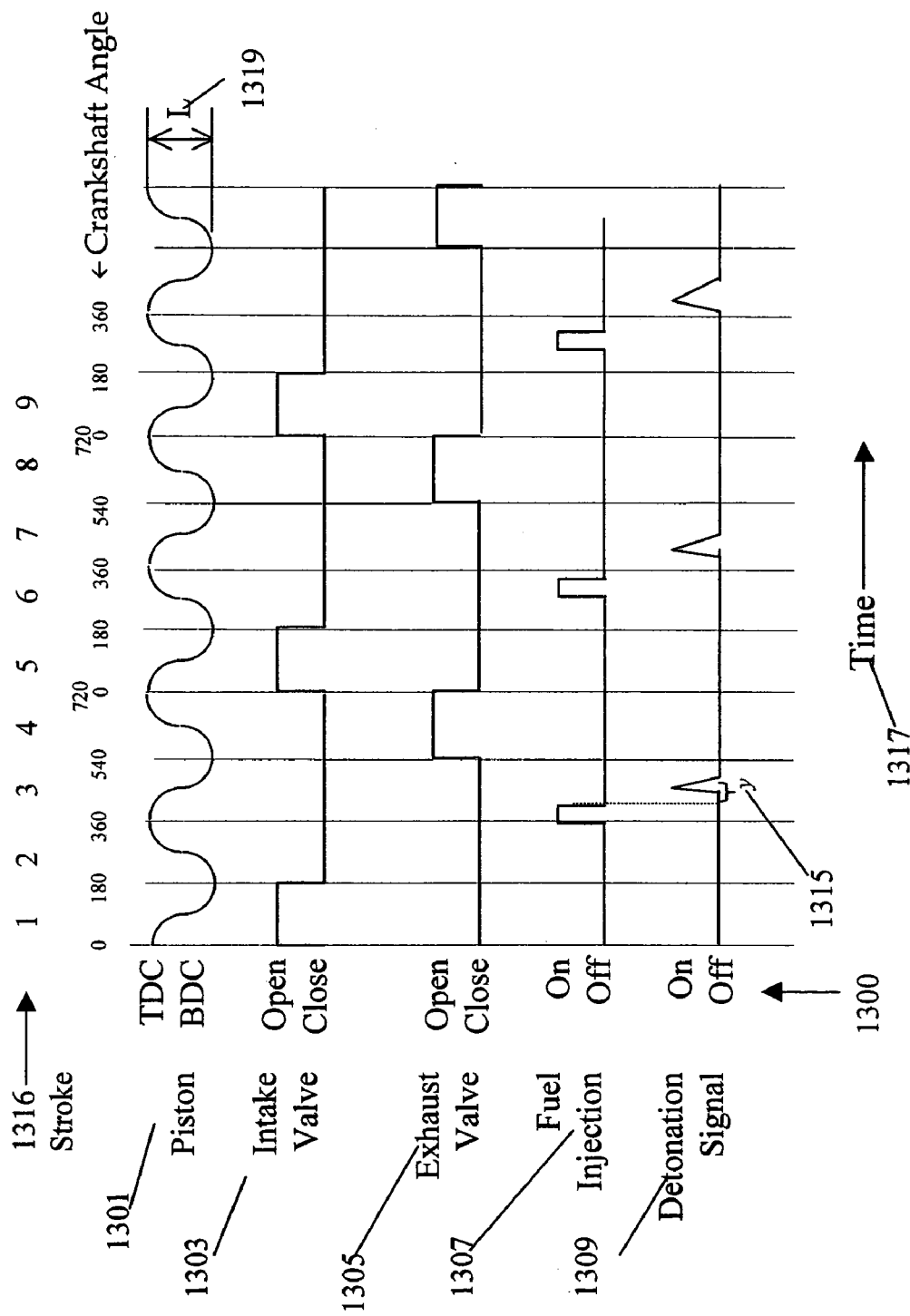
FIG. 13 is a timing diagram illustrating cylinder unit component states as functions of time in CI mode according to an embodiment of the present invention.

FIG. 13 is a timing diagram illustrating cylinder unit component states as functions of time in CI mode according to an embodiment of the present invention. CI is completely analogous in duty cycles as the CI used in a typical diesel engine, the main exception being all electronically controlled cylinder components. FIG. 13 shows the state positions 1300 and duty cycles for CPCPU components piston 1301, intake valve 1303, exhaust valve 1305, fuel injection 1307, and detonation signal 1309 as functions of time 1317 during CI power cycle in accordance with an embodiment of the invention. In a CI embodiment, fuel injection time is the primary ignition timing control parameter. Fuel is typically and injected at just pre-power stroke 1316-3 and in metered quantities. Thus fuel injection timing is the primary control mechanism in CI mode using fuel injection time incrementally near end of compression stroke 1316-2 to control the pressure profile and thus power from combustion of available fuel. The set fuel injection time would thus vary with fuel characteristics and hence the given fuel. The harder to ignite a particular fuel by reason of its chemical properties, the larger the fuel injection advances necessary eg. high octane fuels may need a more advanced fuel injection time relative to piston TDC than high cetane fuel which ignite much quicker, thus combustion started nearer to power stroke 1316-3 TDC give much more efficient burn power.

In this embodiment, starting on intake stroke 1316-1, the piston 1301 travels from Top Dead Center (TDC) to it's fully extended stroke length L 1319 at Bottom Dead Center (BDC). Unlike SI and HCCI modes, the intake valve 1303 is open typically for the full length of the intake stroke. During the intake stroke the exhaust valve 1303 is closed and the fuel injection 1307 is off.

On compression stroke 1316-2 the intake valve 1303 and exhaust valve 1303 remain closed for the full stroke duration. Unlike the previous described SI and HCCI modes, the CI mode does not vary the CR for ignition control time and does not use a "spring zone" in its intake and compression strokes. Thus the CI compression strokes effective compression is accomplished in relation to the set compression ratio, which defined by the cylinder dimensions and stroke length. In a simple embodiment, the fuel would be injected at near end of compression stroke 1316-2, adjusted by test to find the optimum fuel injection time for a particular fuel.

The third stroke 1316-3 is the power stroke. Injected fuel 1307 into a hot compressed air, while the cylinder valves 1303 1305 remain closed, spontaneously ignites the fuel upon injection into the compressed air causing combustion and forcing the piston 1301 to expand the cylinder volume and in doing so imparts rotational energy and power to the crankshaft. The power stroke pushes the piston 1301 the full length of the stroke. Fuel ignition starts just before power stroke TDC and pressure builds and wanes during the power stroke producing a detonation signal 1309 is sensed and processed much like in SI and HCCI modes for detonation peak pressure, knock transient intensity and knock frequency content. These results are stored and compared with other such tests, incrementally increasing or decreasing fuel injection time in seeking the best test parameter of operation with CI.

The fourth stroke 1316-4 is the exhaust stroke. The exhaust valve 1305 is opened while all the other cylinder valves 1303 remain closed and the piston 1301 pushes the combusted gas past the exhaust valve 1305 port clearing the cylinder and completing the cycle.

In diesel engines, the primary control mechanism for mixture ignition is fuel injection time but ignition is also controled by rate of burn due to fuel dispersal spray pattern as well as fuel chemical properties. Reception of detonation signal or absence of signal is processed, accounting for electronic and processing latencies, to determine if there was ignition and if so, to determine the signal identified parameters. The fuel injection time is advanced or retarded to control factors such as cylinder peak pressure, knock phenomenon, pressure and temperature state before ignition, etc. Since CI mode creates a desired compression ratio above that which would ordinarily spontaneously ignite the mixture, additional ignition control parameters may be applied to prevent pre-ignition or knocking.

Other control parameters used in finer loop testing CI embodiments would include; quality of ambient or compressed air temperature or moisture, quantity of fuel injected, injection spray mode and nozzel, or samller increments of primary control variable iterations.

CI Test Suite Implementation

Figure 14:
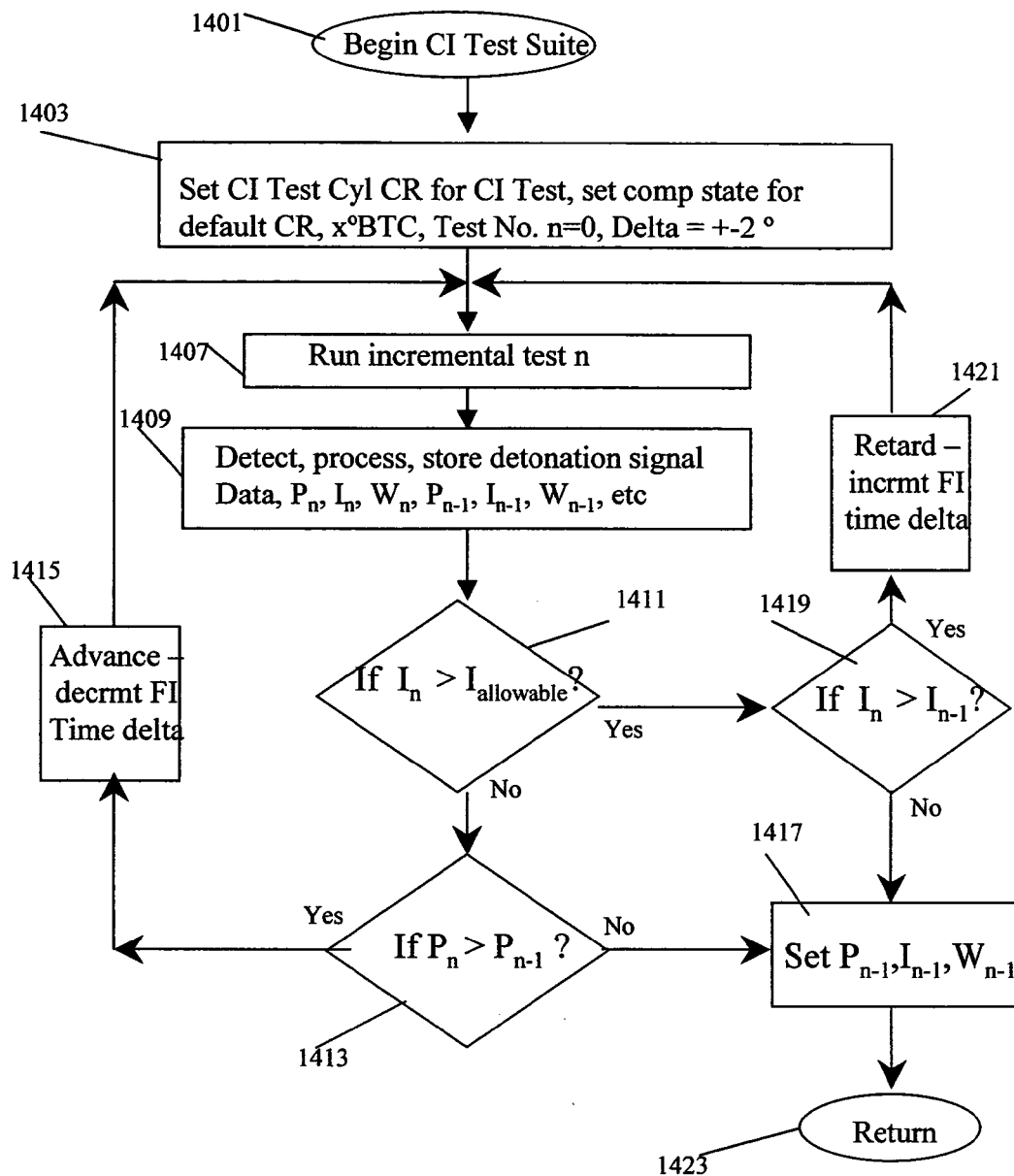
FIG. 14 is a flow diagram illustrating CI test suite algorithm implementation according to an embodiment of the present invention.

FIG. 14 is a flow chart illustrating CI test suite algorithm implementation according to an embodiment of the present invention.

In describing this CI test suite algorithm embodiment, references will be made to the FIG. 4 sequence of SI detonation signal time histories, which will serve as a typical expected test suite for CI with fuel injection substituted for spark advance time, beginning at 28° BTC 403 and advancing the fuel injection time decrementing by 2° at each test to 32° BTC 407. While the CI detonation time histories will differ in waveform from SI detonation time histories, this difference will not negate a fundamental cycle of operation in the CI test suite description. As with the SI mode implementation, the test suite objective is to find the combustion event with the air-fuel mixture detonation that contains tolerable knock characteristics for the highest developed power. The component states and duty cycle applied in that test are used to re-configure the engine to that ignition power mode and refined by additional smaller increment tests and numerical estimation to re-configure and schedule all engine cylinder units based.

The CI test sequence starts at Begin CI Test Suite 1401, where the computer control system logic configures a selected cylinder with the component states in accordance with a CI configuration and initial default parameters, determined by the engine design and programming heuristics for quickest test result convergence. In one embodiment of the invention, the initial cylinder unit component states may be set for a starting CR of 20:1, fuel injection timing to occur at 28° BTC and subsequent ignition test set for 2° increments, and fuel amount as initial parameters in Set CI Test starting parameters 1403. At the appropriate piston position, the selected cylinder component states will be set and the test will be executed with the initial parameters, Run incremental test n 1407, tracking the number n of the test in the suite and associated results obtained from test n combustion. Detonation signal data, $P_n$, $I_n$, $W_n$, $P_n-1$, $I_n-1$, $W_n-1$, will be sensed, processed, and stored 1409 upon combustion of the test amount of given fuel as per the CI stroke sequence duty cycle. The n–1 subscript denotes an immediately previous test result. For a fundamental mode of operation in the FIG. 4 sequence of time histories, each time history is treated as one test in the suite, i.e. 423 knock intensity result in test 405 is subsequent to test 403 which has a default knock intensity of zero. The peak detonation pressure from the primary ignition 418 and the highest intensity from the knock intensity pressure 423 of the 30° test 405, are compared with the previous test highest knock intensity, default zero result and peak pressure 420 in the 28° test 403. The logic threads to examines knock intensity, $I_n$, for an cylinder allowable or engine tolerable set limit 1411. If the detected knock intensity is above the allowed limit, then the knock intensity is compared to the previous test result knock intensity 1419 to determine if the knock is increasing or decreasing. If the knock intensity is increasing, then the previous test parameters are better then the current test parameters and results $P_n-1$, $I_n-1$ are set 1417 as best for this mode and execution is returned 1423. If the knock intensity is increasing from the previous test result 1419, then the mixture ignition timing is retarded by incrementing fuel injection timing 1421, the increment measure amount of 2° followed by the next incremental test iteration n+1 407.

If the detected knock intensity is below the knock intensity limit $I_{allowable}$ 1411, then the logic branches to determine if the peak pressure for this test, $P_n$, is larger than the peak pressure of the previous test, $P_{n-1}$ 1413. If the maximum detonation pressure is increasing from the previous test, then the ignition timing is advanced by decrementing fuel injection time 1415 setting by the measure amount of 2° followed by another incremental test run 1407. If the peak pressure of the current test is less than the previous test 1413, then the previous test results are better and the previous test component duty cycle states and results $P_n-1$, $I_n-1$ are set 1417 as the best states and results for this mode and the logic execution returns to the calling program 1423.

The above logic flow is a simple fundamental mode of operation of CI test suite and only one of many possible algorithm implementations to converge on the test parameters that yield the detonation results for highest effective pressure before the onset of knock phenomena. The test with 28 deg advance fuel injection time 403 would be a first order approximation for the best effective pressure before onset of knock for a monotonically increasing and decreasing detonation curve without knock transients.

In CI, diesel engine, it is generally, the non-uniformity of the pressure within the cylinder that is responsible for knock transients. Non-uniformities can be due to alternate waveform detonations, non-uniform combustion or auto ignition in the cylinder. These phenomena are accounted for in the control process algorithm to determine best combustion characteristics in a test series in CI.

CI Test Mode Implementation

Figure 15:
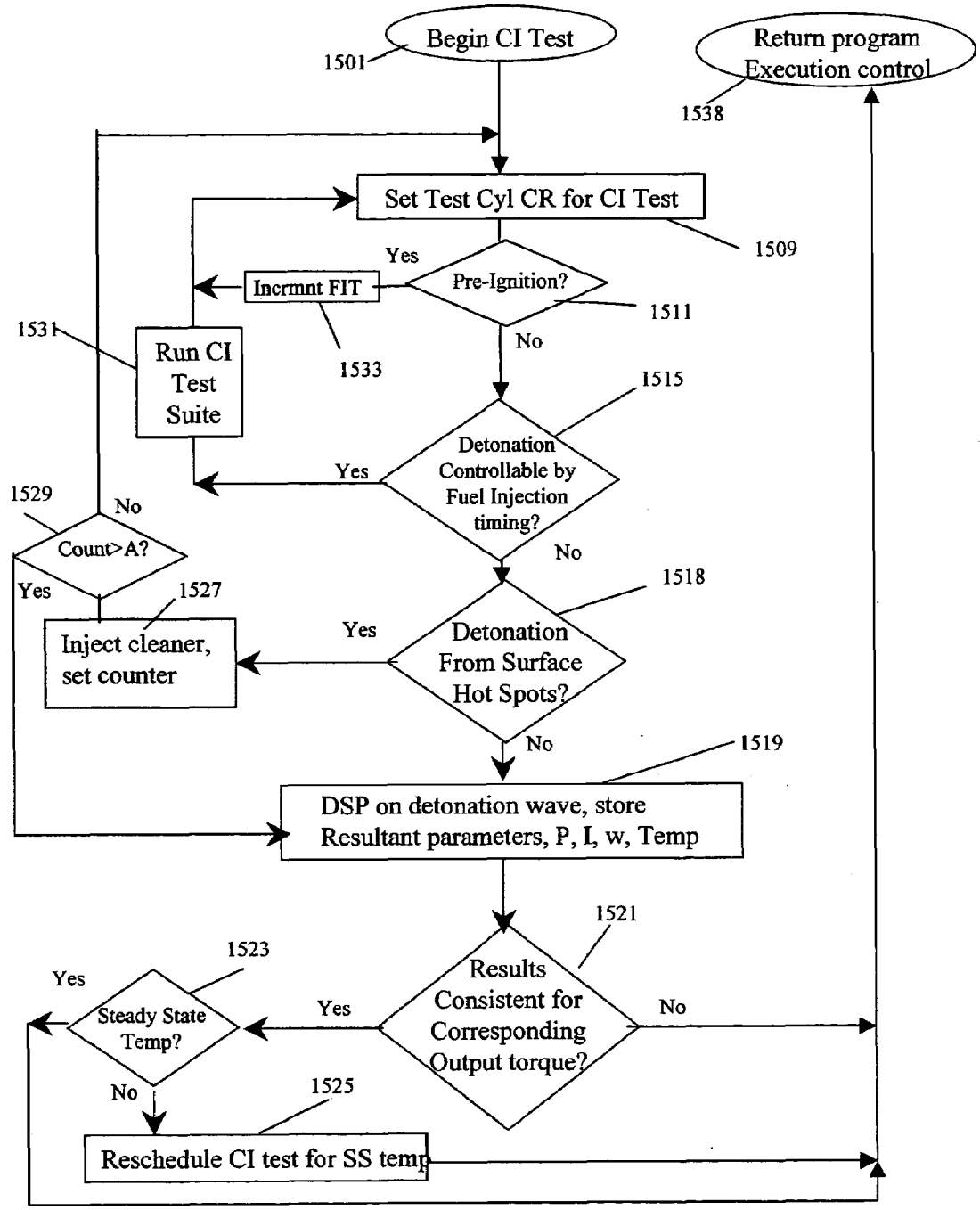
FIG. 15 is a high level flow diagram illustrating CI test mode implementation according to an embodiment of the present invention.

FIG. 15 is a high level flow chart illustrating CI test mode implementation according to an embodiment of the present invention.

The process logic executes substantially like the SI test mode but with a different control parameter, fuel injection time instead of spark initiation. Logic begins to execute the CI test algorithm implementation at 1501. For CI test mode, the cylinder selected for the tests is configured initially 1509 with cylinder unit component states, intake valve state, exhaust valve state, fuel amount to be injected, CR, and any additional component states for CI duty cycle associated piston positions. The components are configured as shown in FIG. 13 for the fundamental mode of operation. Since the primary control parameter for CI is fuel injection time and these are functions of fuel injector type, pressure developed in cylinder and fuel burn rate parameters, the initial CI test parameters would use known fuel combustion characteristics in choosing default primary parameter values to set initial parameter values 1509. Other parameters can be derived by estimation and engineering models and used for selecting initial or default test parameters and component states. For example, typically sized diesel engines of comparable engine power or displacement size to the present invention engine would provide good initial parameter for the CI test.

In addition, initial fuel injection timing is set to provide the test starting point for the quickest test convergence for a given fuel combustion state. Each test consists of a CI power cycle starting with an intake stroke, and ending with a combustion exhaust release. If the detonation signal received indicates peak pressure occurs BTDC, then there is pre-ignition 1511 and the Fuel Injection Time (FIT) may be too far advanced or another mechanism is causing ignition to occur too early. The FIT would then be incremented 1533 followed by re-configuration of another set of cylinder unit parameters 1509 and test re-executed. If there is ignition 1511 then what needs to be determined is if the ignition was from programmed fuel injection 1515 by auto ignition from cylinder unit surface hot spots. Well-behaved fuel injection detonations have measurable characteristics, engine dependent and ascertainable empirically using DSP techniques known to those skilled in the art and described previously. Under favorable CI conditions, peak pressure would also occur within a 10 deg window after TDC, characteristically between 15° and 25° after TDC. Accounting for the difference between time of fuel injection and the detonation signal reception, for processing latencies and engine speed, the actual time position of the detonation signal peak pressure is ascertainable. Detonation peak signals calculated inside this 15°–25° window after TC would indicate that detonation is controllable by fuel injection at the current compression. In this case, the logic would branch to the CI test suits 1531 to determine more precisely where the FIT reaches peak pressure under allowable limits. Detonation peak signals calculated outside this window would indicate and auto pre-ignition or post-ignition are occurring and the fuel combustion is not controllable by fuel injection for that state point. If detonation occurs after the window, post-ignition, there is not sufficient heat and or pressure and or the fuel has long burn latency. If the detonation occurs outside the window, pre-ignition or post-ignition, with multiple wave fronts indicative of multiple hot spot ignition sources are detected, then detonation occurs potentially from surface hot spots 1518 and the cleaner injection 1527 or other surface clean method is warranted. Fuel injectors or plugs may also be fouled in which case the cleaner could serve a triple purpose. If hot spot auto-ignition continues beyond the set counter number 1529 of tests, the compression ratio can be decremented and HCCI mode will likely engage best fuel operating point. Thus ignition results would indicate what is needed and the logic designed converge on the best operating parameters under the best ignition mode. To prevent endless looping, software structures such as simple counters can suffice in some embodiments, as shown for injection cleaner 1529 execution and implemented to eventually discount the surface hot spot factor or other factors and defer to better results by storing the best test results and associated parameter state cycles 1519 and branching execution to return to the main flow of execution under the theory that the fuel is not best combusted in this CI mode. In another embodiment checks are made for best test results and used for a preset number of power cycles to compare with resulting output power or torque 1521 data. Unacceptably low output power branches logic to return 1538 execution control while acceptable corresponding output power results would branch to an engine temperature check 1523. If the engine is still cold, the CI tests can be rescheduled 1525 to run again in a few minutes before returning 1538 execution control. A steady state engine temperature 1523 would not reschedule before return 1538 of execution control.

Overall Test Program Flow

Figure 16:
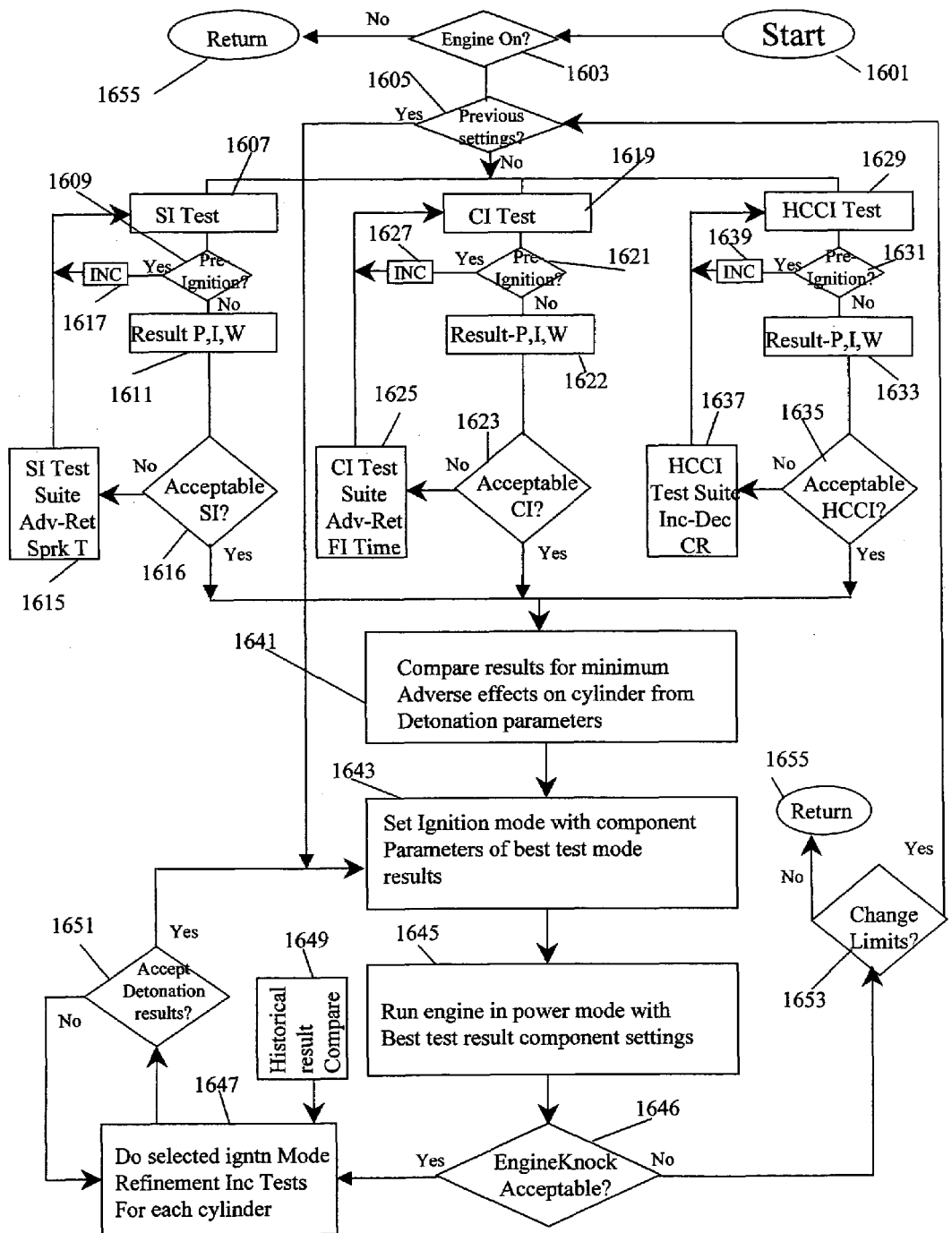
FIG. 16 is a high level flow diagram of an AVFICE embodiment for a given fuel parameter identification and corresponding engine re-configuration.

FIG. 16 is a high level flow diagram of an AVFICE embodiment for a given fuel parameter identification and corresponding engine re-configuration. The overall process is described here for receiving and processing fuel combustion characteristic signals and data from the various ignition method combustion events and detonation signal processing from those events to determine the fuel ignition method which will result in maximum power with allowable engine wear for a given fuel in accordance with an embodiment of the invention.

The control logic begins execution 1601 and checks if the engine is on 1603. Without engine power the program returns 1655. The logic queries if engine is on, whether there is power, was there previous settings 1605 defining the power cycle engine component settings that were determined previously and still valid or fuel otherwise known. This can be ascertained by virtue of sensing an increased fuel tank level, pressure or other indicator that the fuel composition has changed. The previously stored additional fuel parameter would indicate if the fuel is a gaseous form such as hydrogen, propane etc. The previously stored engine fuel can also be selectable from a known library of options by engine operator to reduce testing and waste. An aspect of the invention would defer the test suite selection to stored data on typical market fuels, last type of fuel used and if there had been a fuel addition since that time.

If there is no change in fuel composition or the fuel to be run is operator selected, then previous engine power settings 1605 are retrieved from computer memory and invoked in the power operation without further need for determination of best ignition and engine re-configuration. The previous settings define the engine component state and strokes that optimally utilize a particular fuel based on its combustion characteristics and engine design parameters. Once the engine power operation component states have been determined for the given fuel, the program threads control to the engine power cycle operation process 1643, wherein the control system operates the engine based on these component settings and strokes as per the duty cycle and individual states dictate.

If there are no previous or selected indicators 1605 indicating a known fuel, a fuel similar to previous engine operation or stored selection, the default component state settings and duty cycles are invoked for the SI, CI and HCCI tests to determine by testing, what are the combustion characteristics for a particular unknown fuel that yield the most power with allowable associated engine knock for a particular cylinder unit at that particular cylinder unit temperature. These tests can be done in parallel for the ignition methods SI 1607, CI 1619, and HCCI 1629 mode tests per allocated cylinder independent of each other save comparing results from all ignition mode test mode loops 1641.

Figure 17:
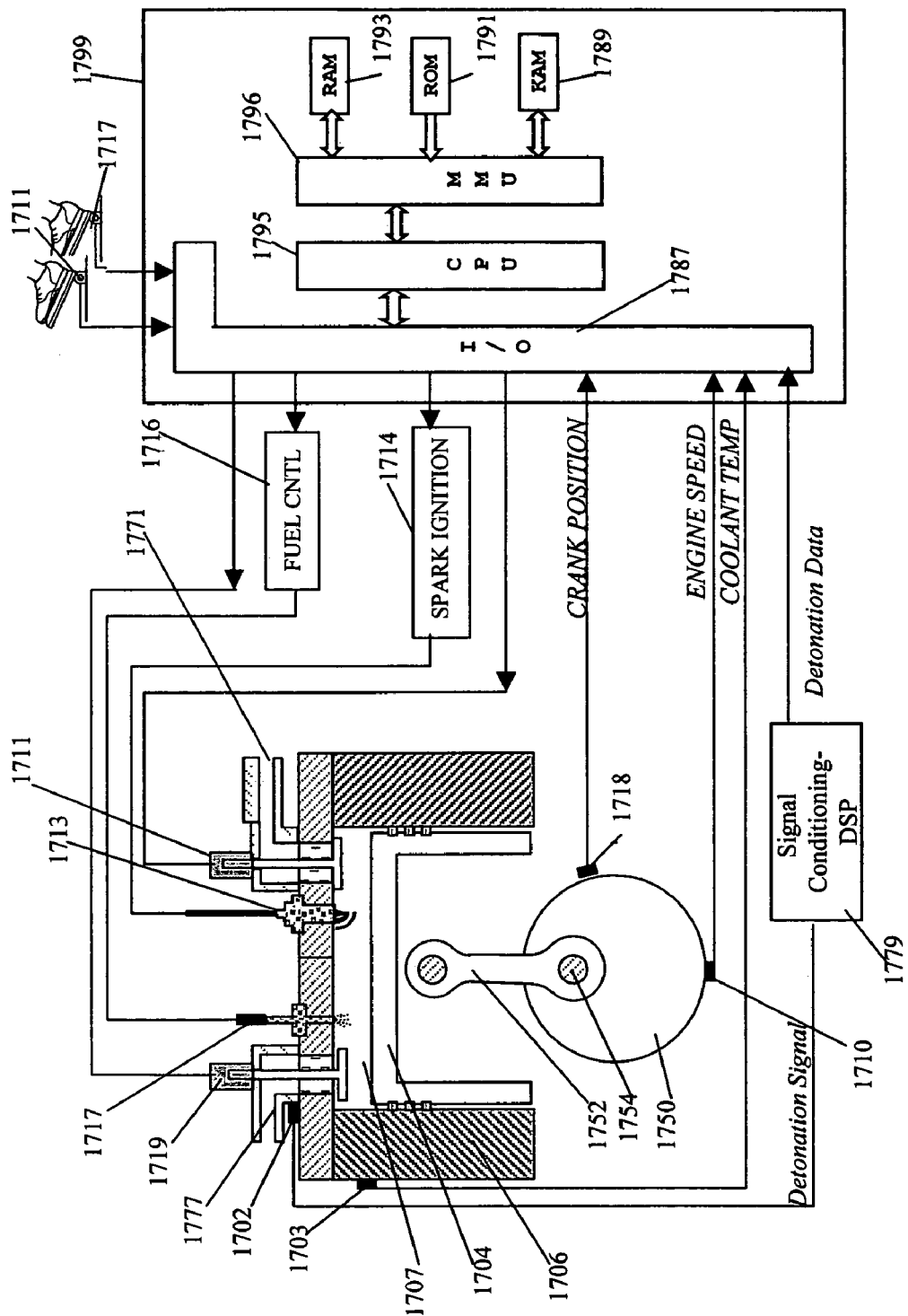
FIG. 17 is a schematic of a one CPCPU AVFIC engine and associated control system for controlling the AVFIC engine, according to an embodiment of the present invention.

SI Test Mode 1607 is as more thoroughly described in above for FIG. 8, consists of a Pre-ignition check 1609, Branch to increment-decrement spark advance 1617, Process detonation signal and store signal processing results P, I, w values 1611, ascertain acceptability of resultant values 1616, execute SI test suite 1615, described in detail for FIG. 17, if in acceptable SI range.

CI Test 1619, is as more thoroughly described in above for FIG. 15, consists of a Pre-ignition check 1621, increment-decrement FI Time 1627, Process signal and store values 1622, check if P, I, w, values ascertain if in acceptable range 1623, execute CI test suite 1625, described in detail for FIG. 14, if in acceptable CI range.

HCCI Test 1629, is as more thoroughly described in above for FIG. 12, consists of a Pre-ignition 1632 check, increment-decrement of CR 1639, Process detonation signal and store resultant P, I, w values 1633, execute HCCI test suite 1637, described in detail above, if in acceptable HCCI range.

Processed detonation signal results are compared for minimum adverse effects on cylinder such as pressure or knock intensity above allowable cylinder limits or detonation frequency content in proximity to natural cylinder component frequencies 1641 are converged on for best found for each particular ignition method. The best results from each ignition method are then compared against the best results from the other ignition modes. Test results with the highest power out but still within allowable cylinder pressure limits and frequencies determine the best ignition mode for the given fuel. The test component states associated with the determined best test results 1643, such as ignition mode duty cycles for component states, etc are retrieved and used in re-configuration of component parameters and settings.

The engine is then configured to run in power mode with best test result component settings 1645. Individual cylinders in the engine must then be checked in a refinement check for knock values against overall engine acceptable knock intensity limits 1646. The logic branches to execute the selected ignition mode refinement test suites for the selected ignition mode for each cylinder 1647 accounting for any systemic uniqueness such as steady state temperature differentials etc. If the overall cylinder acceptable limits 1651 are met, the best cylinder refinement results are factored back into reconfiguration 1643 or refined further 1647. If the knock encountered is unacceptable 1645, execution branches to a acceptable limits check 1653 complete retest 1605 with better initial parameters or a program return 1655.

Thus the above test scenarios illustrate an aspect of the invention which provides means of altering test cylinder fuel ignition modes, receiving sensor data, digitizing and analyzing wave form for intensity, freqency content and timing and settable criteria checks. Data and parameters are processed and compared with the other cylinder ignition tests for potential engine damage, for emmissions and then for performance, changing engine configuration dynamically in accordance with information sensed and processed with information from other sources to configure an engine for a particular fuel.

Integration of Engine and Controls

FIG. 17 is a schematic of a vehicle having a AVFIC engine and an engine control system for controlling the AVFIC engine, only one CPCPU shown, according to an embodiment of the present invention.

As shown in FIG. 17, the engine controller 1799 nominally includes a microprocessor or central processing unit (CPU) 1795 in communication with computer readable storage devices 1793 1791 and 1789 via memory management unit (MMU) 1796. The MMU 1796 communicates data (including executable code instructions) to and from the CPU 1795 and among the computer readable storage devices, which for example may include read-only memory (ROM) 1791, random-access memory (RAM) 1793, keep-alive memory (KAM) 1789 and other memory devices required for volatile or non-volatile data storage. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical, wireless or combination memory devices capable of storing data, including executable code, used by the CPU 1795 for controlling the AVFIC engine and to some extent the vehicle hosting the AVFIC engine. Input/output (I/O) interface 1787 is provided for communicating with various sensors, actuators, DSP units 1779 and control circuits, including but not limited to the devices shown in FIG. 17. Input devices include an engine speed sensor 1710, crankshaft position 1718, cylinder detonation sensor 1702, engine coolant temperature 1703, power pedal position sensor 1711, brake pedal position sensor 1712. Signal conditioning and DSP 1779 logic process the cylinder detonation signal and are programmed to provide resultant values of signal peak pressure, knock intensity and signal frequency content. These results are then forwarded to the I/O interface 1787 where other programmable logic then processes the resultant inputs per CPCPU source signal as described above.

Testing and operating command and control includes electronic fuel control driver 1716 for fuel injector 1717 injection timing and fuel quantity control 1716 and other functions, spark ignition system 1714 for SI spark 1713 timing advance-decline control and other functions, electronic intake valve actuator 1711 for HCCI CR control and other functions, and electronic exhaust valve actuator 1719. These outputs are shown for one cylinder unit but could apply for each cylinder unit in the engine and are used to control the states for the cylinder components in concert with associated piston 1704 to generate stoke sequences from programmed tests and modes of operation. Also shown are the crankshaft 1750, connecting rod 1752 which for some embodiments may contain stress or strain sensors for power output signals, connecting rod 1752, crank pin 1754, cylinder 1706, piston 1704 and the volume in the CPCPU above piston 1707 at TC. The CPCPU inlet 1771 and exhaust 1777 channels are also shown.

The sensors shown provide information about events, conditions and vehicle operating parameters that affect the scheduling of CPCPU tests and engine mode invocation. The term "vehicle operating parameters" herein refers broadly to any vehicle operating parameters, including engine-operating parameters, which are sensed, computed, derived, inferred or otherwise provided. Other vehicle sensors such as fuel tank level meters and pressure gages are not shown in present embodiment but are not precluded from application by this invention as the embodiment shown is illustrative of a simple fundamental mode of operation. Test algorithms for combustion parameters and modes of operation are comprised of engine component state configurations that define operational states with strokes and in concert with individual piston stroke sequences. The controller 1799 receives signals from vehicle operating parameters, processes stored logic which uses the parameters to schedule CPCPU tests and modes of operation with engine cylinder units in real-time.

CPCPU Ignition Mode Operation and Test Transitions

Within the mechanical continuity of the basic crankshaft-piston rod-piston-cylinder position constraints, the present invention embodiment computer control system can transition individual CPCPUs between operating modes in virtually real-time. Since the AVRIC is under processor control, electronic sensor, processor response time and electronically controlled CPCPU components under computer control are orders of magnitude (nanoseconds) shorter than can be accomplished with mechanical control components (milliseconds) where practical. The electronic switching latency times controlling mechanical component states shorten the difference but electronic switching retains sufficient margin over mechanical switching to allow flexibility and speed required for the dynamic re-configuration to occur. Switching test modes for a particular CPCPU would occur instantaneously relative to the engine RPM. Although switching test modes for a particular CPCPU can likely be implemented most efficiently when the piston position is nearing the TDC of a stroke, a CPCPU mode change can be initiated at any part of the engine crankshaft angle or position because the component states are defined with reference to piston position which is a known function of a known quantity, the crankshaft angle. Initiation of mode is also dependant upon computer system latencies and mechanical component response delays. These known characteristics and engine parameters can be anticipated and programmed into control logic to correct and predict component state timing for optimal results. A CPCPU could continue to run or cease to function in the previous test mode in anticipation of a new program commanded test mode of operation in accordance to programmable logic based on obtained results or other factors. A simple CPCPU transition sequence may include stopping fuel injection, stopping spark, opening the exhaust valve and waiting for the piston to reach top of a stroke before initiating a new mode sequence. Alternatively, a test mode can be completed within a crankshaft cycle and or the mode can be programmed to begin at CPCPU TDC or some appropriate crankshaft angle where the CPCPU piston is proximate to the top of its stroke with sufficient advance period.

There are various methods to derive and even predict individual CPCPU piston positions. A simple method to track piston positions among the engine CPCPUs could be done by using a known crankshaft position from the crankshaft position sensor, using the relationship of individual CPCPU piston positions to the crankshaft rotation angle. Crankshaft rotation sensors can be used to determine such things as degrees before top dead center (TDC), TDC, spark timing, fuel injection timing and other various logic data requirements. Crankshaft position sensors are readily available as are electronic methods of maintaining exact crankshaft angle for CPCPU timing, transition and mode cycle basis which are known by one skilled in the art.

In an embodiment of the invention, engine CPCPUs can work at different test modes on input sensor data, programmed test mode algorithms and programmed duty cycles for particular modes concurrently. Moreover, in transition of a CPCPU from one test mode to another, a previous mode piston stroke can be completed as signaled by the crankshaft angle before the new test mode engages. Many factors such as engine thermal characteristics, material stress distribution, engine vibration, uniform component wear, engine power requirements, component state switching latencies, computer and computational latencies and engine parameters can be considered in operation and timing of the different CPCPUs in an optimal mixed test mode configuration. However, for the fundamental mode of operation, the ignition mode tests would most likely be conducted at the lower engine speeds presumably under starter motor revolutions or early power revolutions and where computer latencies may not be a significant source of delay for realtime response purposes.

In mixed mode test operation, testing of different ignition methods can run in parallel. One or more selected engine cylinder units are computer program controlled and operated in an ignition mode different from, but in concert with one or more alternate engine cylinder units executing another ignition mode while maintaining crankshaft timing adherence to cylinder piston position stroke continuity by electronically setting cylinder unit component states in accordance with programmed computer logic responsive to sensor input signals and programmed duty cycle modes and crankshaft rotation for selected concurrent operation.

Although gasoline and diesel fuels are mentioned in some invention embodiments, the invention is equally applicable to gas-diesel blends, hydrogen, propane, natural gas and other combustible fuels. Duel Fuel stratification as well as other fuel ignition methods are not precluded by this invention and can be integrated as well. Other embodiments of the invention can use piston-cylinder configurations such as in a rotary engine, where the cylinder is exchanged for a conformable volume, which upon gas expansion in the cylinder function in similar fashion to rotate a crankshaft. Although a four CPCPU engine embodiment is described, the present invention can be adapted to larger or smaller number of CPCPU engines, engine designs with CPCPUs working in-line, opposed, vee, or radial configurations. Also not precluded are fuel combustion test algorithm implementations using more sophisticated adaptive, feedback and or prediction schemes that are more encompassing and or converge faster on the optimum parameters and states for engine power operation mode using a given particular fuel.

While this invention has been described and illustrated with reference to particular embodiments, it will be readily apparent to those skilled in the art that the scope of the present invention is not limited to the disclosed embodiments but, on the contrary, is intended to cover numerous other modifications, alterations, adaptations and equivalent arrangements may be made by those skilled in the art without departing from the spirit and scope of the invention.

What is claimed is:

1. A programmable internal combustion engine re-configurable to operate with a given fuel from a range of combustible fuels comprising:
   one or more cylinder units each with expanding and contracting cylinder volume and associated stroke sequences;
   each cylinder unit having an intake port and an electronically controllable intake valve component having multiple states under computer control;
   each cylinder unit having an exhaust port and an electronically controllable exhaust valve component having multiple states under computer control;
   each cylinder unit having an electronic fuel injector component having multiple states under computer control;
   each cylinder unit having computer controlled means for igniting an air-fuel mixture in the cylinder volume, ignition means chosen from a group consisting essentially of; spark ignition, homogeneous charge compression ignition and compression ignition;
   a computer usable medium;
   a computer control system comprising computer readable program logic embodied in the computer usable medium for controlling individual cylinder units by actuation of cylinder components through programmed sequences of states and strokes providing detonation signal from fuel combustion;
   one or more sensors for sensing detonation signal;
   detonation signal computationally processed for identified parameters which are stored in computer usable media;
   identified parameters compared for power developed from combustion, whereby identified parameter results determine ignition method and cylinder component state sequences in re-configuring cylinder units for engine power operation using the given fuel.

2. A programmable internal combustion engine re-configurable to operate with a variable fuel from a range of combustible fuels comprising:
   one or more cylinder units each with expanding and contracting cylinder volume and associated stroke sequences;
   each cylinder unit having an intake port and an electronically controllable intake valve component having multiple states under computer control;
   each cylinder unit having an exhaust port and an electronically controllable exhaust valve component having multiple states under computer control;
   each cylinder unit having an electronic fuel injector component having multiple states under computer control;
   each cylinder unit having selectable computer controlled means for igniting an air-fuel mixture in the cylinder volume;
   a computer usable medium;
   a computer control system comprising computer readable program logic embodied in the computer usable medium for controlling individual cylinder units by actuation of cylinder components through programmed sequences of states and strokes providing detonation signals from fuel combustion;
   one or more sensors for sensing detonation signals;
   detonation signals computationally processed for identified parameters which are stored in computer usable media;
   identified parameters compared for power developed from combustion, whereby identified parameter results determine ignition method and cylinder component state sequences in re-configuring cylinder units for engine power operation combusting a given fuel.

3. A programmable internal combustion engine as in claim 2 further comprising programmably selectable fuel ignition means chosen from a group consisting essentially of; spark ignition, homogeneous charge compression ignition and compression ignition.

4. A programmable internal combustion engine as in claim 2 further comprising processing detonation signals from a plurality of programmed cylinder combustion events, selecting the event signal with identified parameters of maximum peak pressure and associated knock transient intensity which are less than set allowable limits.

5. A programmable internal combustion engine as in claim 2 further comprising processing detonation signals from a plurality of programmed cylinder combustion events, selecting the signal with identifiable parameters representing cylinder unit power developed from the event, parameter values extracted through mathematical integration of the detonation signal.

6. A programmable internal combustion engine as in claim 2 further comprising processing detonation signals from a plurality of programmed cylinder combustion events, selecting the signal with identifiable parameter values representative of fuel characteristic rate of burn, parameters extracted through mathematical differentiation of detonation signal.

7. A programmable internal combustion engine as in claim 2 further comprising a spark ignition test suite wherein control system executes program logic controlling cylinder unit component state sequences in concert with the cylinder unit piston position, performing a series of combustion cycle events varying spark ignition timing, each ignition event combusting controlled fuel quantity generating a detonation signal from which identified parameters representative of power and knock transient intensity are computationally extracted, storing parameter results and associated event settings in computer media for determining re-configuration of component settings and state sequences.

8. A programmable internal combustion engine as in claim 2 further comprising a homogeneous charge compression ignition test suite wherein the control system executes program logic controlling cylinder unit component state sequences responsive to the cylinder unit piston position, performing an intake and compression-exhaust stroke sequence to establish an initial compression ratio from combustion time and associated piston position, with established compression ratio determining subsequent cylinder unit components states and strokes, performing a series of combustion events, by electronically controlling the intake valve open state period on intake stroke proportionate to the time necessary for piston to achieve spontaneous combustion for given cylinder dimensions on the following compression stroke substantially near piston top dead center with selected offset, a following power stroke, compression and power strokes with intake and exhaust valves closed, followed by an exhaust stroke wherein the exhaust valve is opened, varying selected offset for each combustion event, each event generating a detonation signal for computationally extracting identified parameters representative of power and knock transient intensity, storing parameter results and associated event configuration settings in computer media.

9. A programmable internal combustion engine as in claim 2 further comprising a compression ignition test suite wherein the control system executes program logic controlling cylinder unit component state sequences responsive to the cylinder unit piston position, performing a series of combustion events from intake, compression, power and exhaust stroke sequence, varying fuel injection time in each event generating a detonation signal for computationally extracting identified parameters representative of power and knock transient intensity, storing parameter results and associated test configuration settings in computer media.

10. A programmable internal combustion engine as in claim 2 further comprising execution of program logic controlling cylinder unit component states in accordance with defined cylinder unit states sequentially performed in concert with the cylinder unit piston position to create a combustion event from an intake, compression, power and exhaust stroke sequence, selected ignition means used to combust fuel mixture at programmed times, generating detonation signals, each of which are computationally processed extracting identified parameters representative of power and knock transient phenomenon from each detonation signal, selecting the events producing parameters with the maximum power representative value and associated transient pressure intensity value which are less than the selected allowable limit.

11. A programmable internal combustion engine as in claim 2 further comprising selecting ignition mode for testing fuel combustion characteristics through a series of combustion events each series of events using an alternate ignition method, computer system controlling programmed execution of fuel ignition for each event in each suite, providing detonation signal from each event which is computationally processed for representative combustion power, knock transient and frequency content identified parameters to determine the ignition mode by comparison of signal power, knock intensity and frequency content parameters, determining event having highest power representative parameter value not in excess of set limits and within set resonance correlation between detonation signal frequency content and associated cylinder component natural frequencies.

12. A programmable internal combustion engine as in claim 2 further comprising mixed combustion ignition mode wherein one or more cylinder units operate in a mode different from but in concert with, one or more alternate engine cylinder units operating in a different combustion ignition mode, ignition modes chosen from a group consisting essentially of; spark ignition, homogeneous charge compression ignition, and compression ignition, by programmable logic electronically controlling cylinder unit component states and strokes sequences.

13. A programmable internal combustion engine as in claim 2 further comprising digital signal processing of detonation signals, extracting signal peak pressure and associated time of occurrence, signal frequency content, extracting correlation parameters between signal frequency content in resonance with cylinder unit natural frequencies, selecting the event providing the highest peak pressure and intensity transient not exceeding allowable pressure limits and with allowable frequency content natural frequency resonance correlation limits.

14. A programmable internal combustion engine as in claim 2 further comprising high speed analog circuitry to process detonation signal using analog signal processing components from the group of analog circuit components performing integration, differentiation, convolution, discrete or continuous transforms, transfer functions and general mathematical manipulation, to process detonation signal for identified parameters to provide resultant values in real-time, values are compared with other detonation signals computationally processed providing results used in determining the combustion event yielding characteristics for establishing power mode engine component settings.

15. A programmable internal combustion engine as in claim 2 further comprising the computational use of stored engine temperature profiles with sensed temperature references to extrapolate temperatures from specific engine locations lacking temperature sensors.

16. A method of configuring an internal combustion engine to run on any fuel from a range of combustible fuels, engine operating with one or more cylinders, each cylinder containing a reciprocating piston and having a known volume at each position of said piston, said pistons being connected to a crank shaft, the engine further comprising means for introducing air and fuel into said cylinders to form a combustible mixture, means for electronically controlling ignition of said combustible mixtures, means for exhausting combustion gases from said cylinders, means for obtaining crank shaft position, at least one sensor for providing detonation signal with respect to piston position, the engine comprising a programmable computer control system for electronically controlling cylinder intake and exhaust valve states, fuel delivery quantity and ignition method and timing, and signal detection, acquisition, processing and storing of signal processed identified parameter results into computer usable storage medium, and signals received from programmably controlled cylinder combustion events, engine configuration steps comprising, retrieving duty cycles defining cylinder component state sequences as functions of piston stroke positions, from computer usable storage medium;

configuring cylinder components in conformance with retrieved component state sequences and fuel ignition means;

igniting the air-fuel mixture in accordance with configured components and fuel ignition means producing a combustion event;

receiving sensor detonation signal from cylinder combustion event;

computationally processing detonation signal for identified parameter values representative of combustion induced work done on piston during power stroke, knock transients intensity, and associated parameter times with reference to piston position;

storing values in computer memory;

comparing processed signal identified parameter values from previous combustion event signal parameter values;

choosing determinative fuel combustion characteristic results by selecting the processed signal values with the highest representative piston work parameter values and associated knock transient parameter values below a settable cylinder pressure limit criteria;

configuring the engine with cylinder component states and state sequences associated with the determinative combustion results, and operating the engine combusting the given fuel with the configured component states, sequences and ignition mode responsive to engine power demands.

17. A method as recited in claim 16 further comprising fuel ignition means from a group of ignition methods consisting essentially of; time controlled spontaneous combustion from compression of fuel mixture in cylinder through electronic control of intake valve open state period on intake stroke for homogenous charge compression ignition, time controlled fuel injection into cylinder state conditions above mixture spontaneous ignition conditions for compression ignition, and time controlled spark admission into mixture in cylinder for spark ignition.

18. A method as recited in claim 16 further comprising estimating start of ignition time by extracting time of peak pressure from detonation signal locus, and using empirical analytical or numerical correlation to estimate start of ignition time from actual detonation locus of peak pressure time, accounting for signal reception latencies and computational processing latencies correlating actual peak pressure to an estimated start of ignition time.

19. A method as recited in claim 16 further comprising varying the selected cylinder combustion spark time in a series of combustion events, computationally processing detonation signal for identified parameter values and comparing to prior combustion event signal processed parameter values for determining governing spark ignition event results.

20. A method as recited in claim 16 further comprising varying the selected cylinder combustion fuel injection time in a series of combustion events, computationally processing signal identified parameter values and comparing to prior combustion event signal processed parameter values for determining governing compression ignition event results.

21. A method as recited in claim 16 further comprising varying the cylinder mixture spontaneous start of combustion time in a series of combustion events, computationally processing signal for identified parameter values and comparing to previous combustion event signal processed parameter values in determining the governing homogeneous charge compression ignition event results, reconfiguring and operating the engine with the given fuel under the determined governing combustion result configuration.

* * * * *